United States Patent

[11] 3,536,097

[72] Inventors Michael J. Caparone
Arcadia;
Theodore J. Dykzeul, Rolling Hills, Edward B. Scharer, Lynwood, and Henry C. Braucksiek, Buena Park, California
[21] Appl. No. 684,760
[22] Filed Nov. 21, 1967
[45] Patented Oct. 27, 1970
[73] Assignee Robertshaw Controls Company
Richmond, Virginia
a corporation of Delaware

[54] CONTROLLER AND MIXER OF PLURAL FLUIDS AND METHOD
18 Claims, 20 Drawing Figs.
[52] U.S. Cl. .................................................. 137/599,
137/337, 137/555, 137/606
[51] Int. Cl. ..................................................... F16k 19/00
[50] Field of Search ........................................ 137/337,
599, 599.1, 605, 606, 607

[56] References Cited
UNITED STATES PATENTS
| | | | |
|---|---|---|---|
| 1,525,393 | 2/1925 | Jernatowski | 137/606 |
| 2,528,422 | 10/1950 | Chace | 137/606X |
| 2,584,420 | 2/1952 | Branson | 137/607X |
| 2,823,695 | 2/1958 | Coffin | 137/337 |
| 2,991,481 | 7/1961 | Book | 137/599.1X |
| 3,045,696 | 7/1962 | Cobb et al. | 137/607 |
| 3,192,952 | 7/1965 | Botnick | 137/607 |
| 3,250,295 | 5/1966 | Palmer et al. | 137/606 |

Primary Examiner—Robert G. Nelson
Attorneys—Candor, Candor and Tassone, Auzville Jackson, Jr. and Robert L. Marben ABSTRACT: This application discloses a controller and mixer of plural fluids. A hot water and cold water control arrangement is disclosed, including a mix valve construction with means to supply undiluted hot water, or hot water diluted with cold water to varying ratios. The ratios are determined by selecting controllers, such as buttons, dials, cam wheels, and the like. These selectors determine whether undiluted hot water is supplied to the mix valve or whether various ratios of hot water and cold water are supplied to the mix valve. Also, a cold water valve is provided which is supplied with only cold water. The user may open the mix valve and obtain a desired volume of water, and he may manipulate the selectors to determine the temperature of the water which will be supplied to such mix valve. If he desires only cold water, he opens only the cold water valve. These valves may be connected to a unitary faucet, shower head, washing machine, and any other apparatus for using the water so supplied. Also, these valves may be connected to individual faucets and the like.

Patented Oct. 27, 1970
3,536,097
Sheet 1 of 8
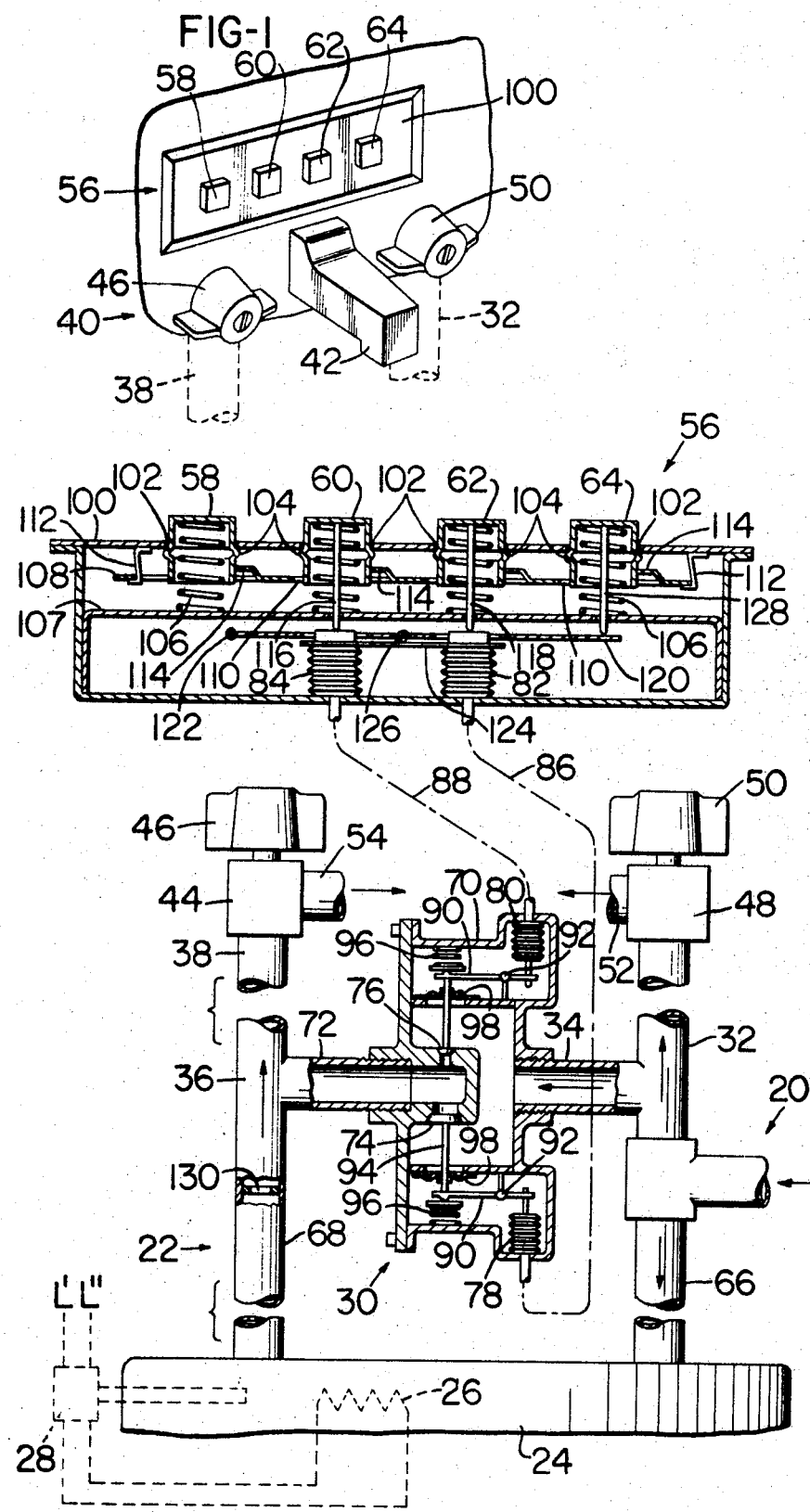

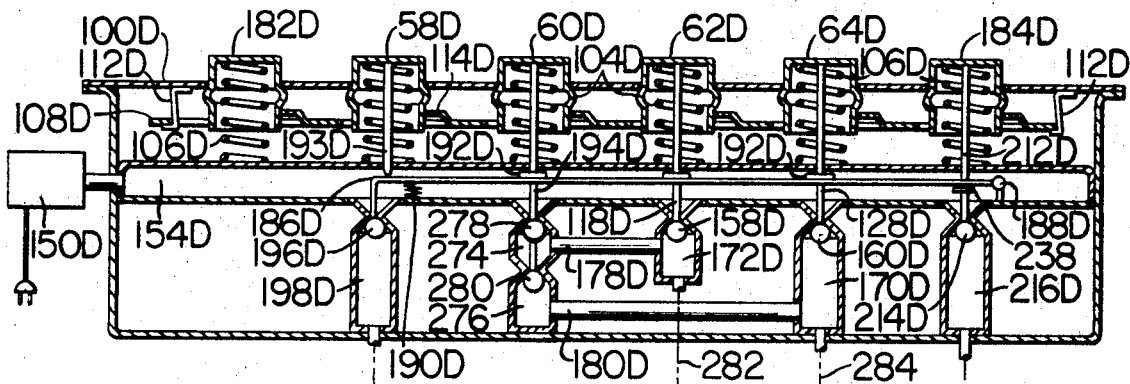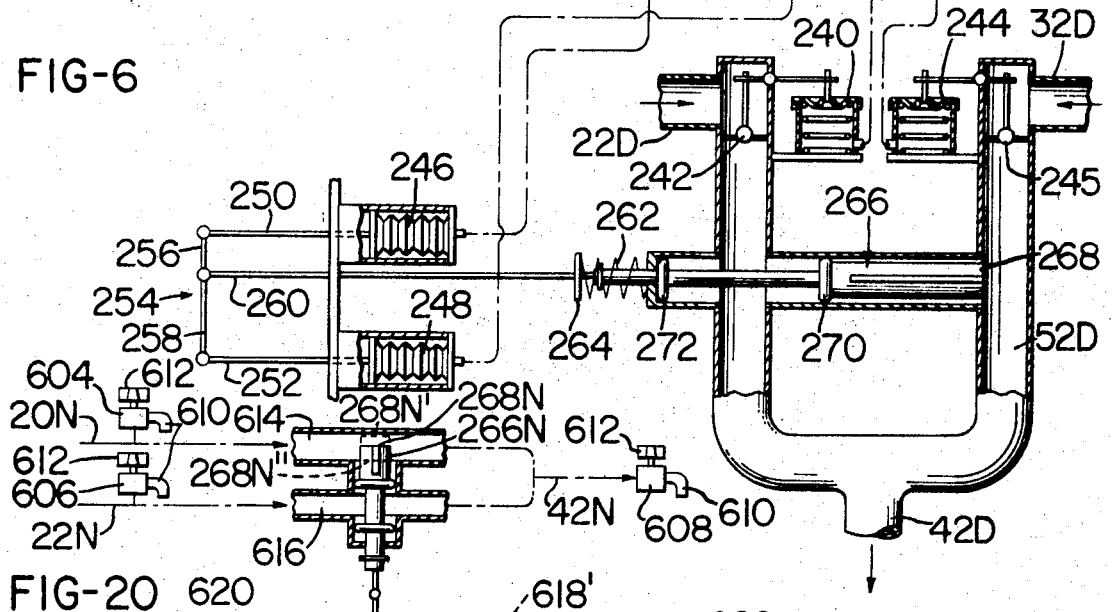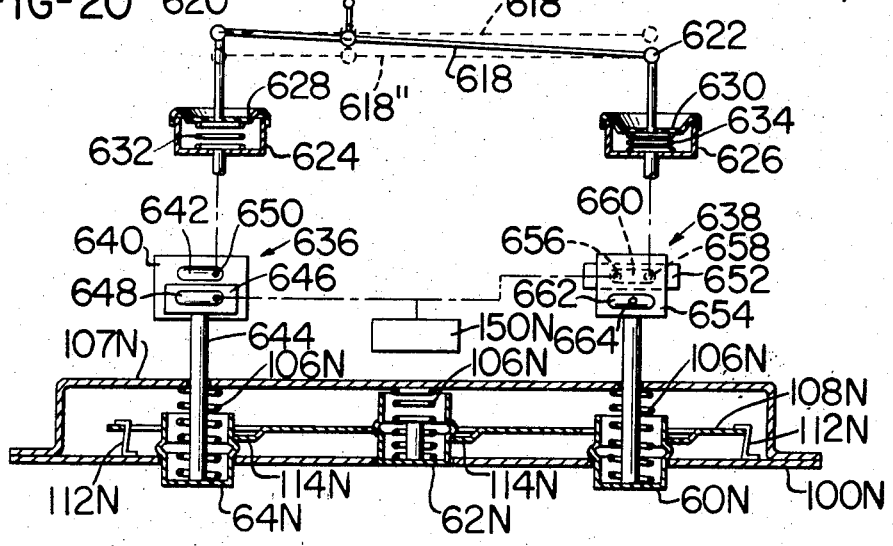

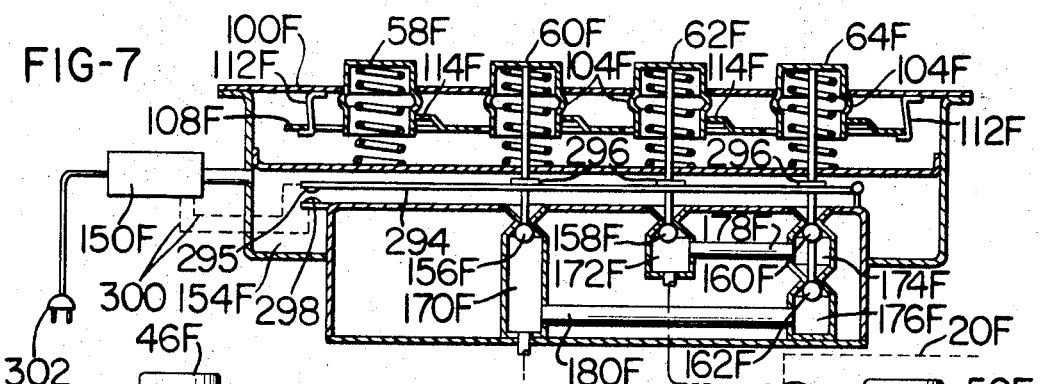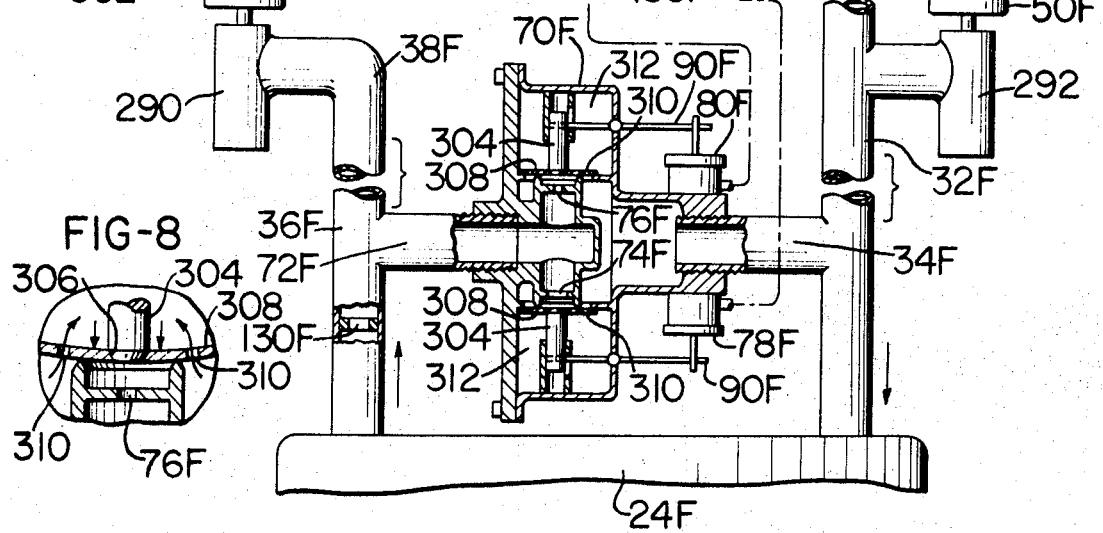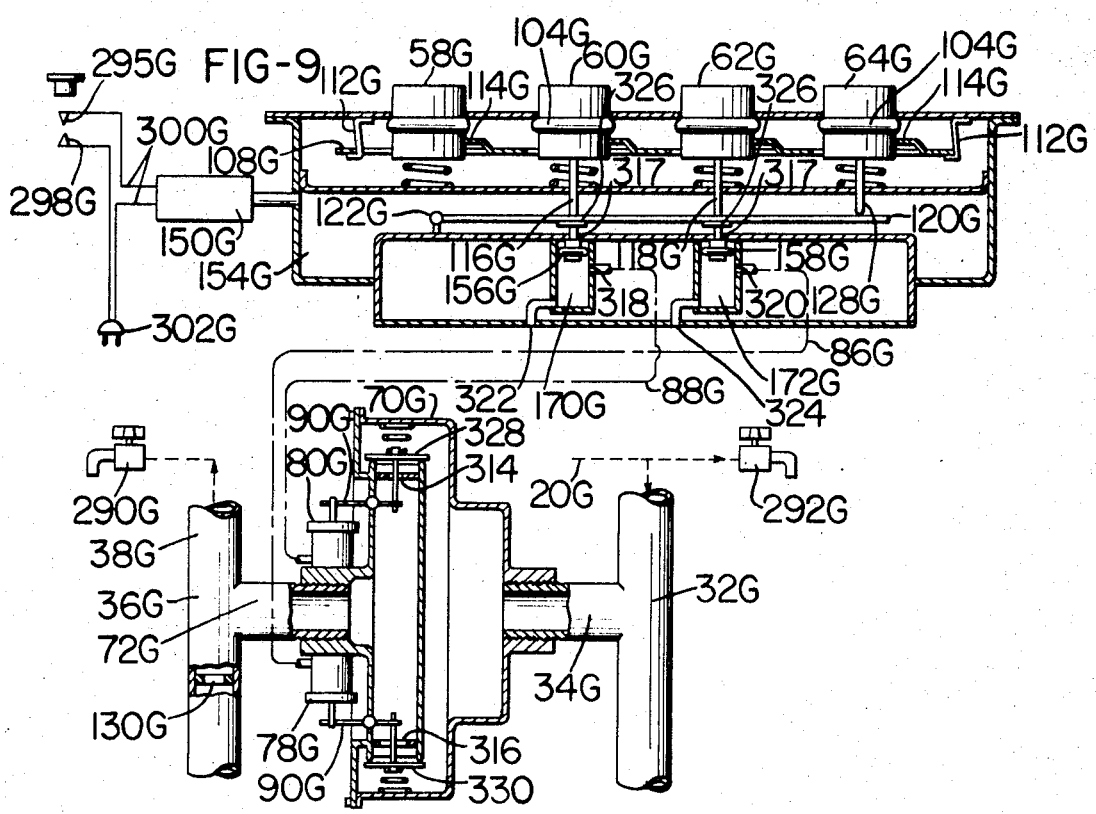

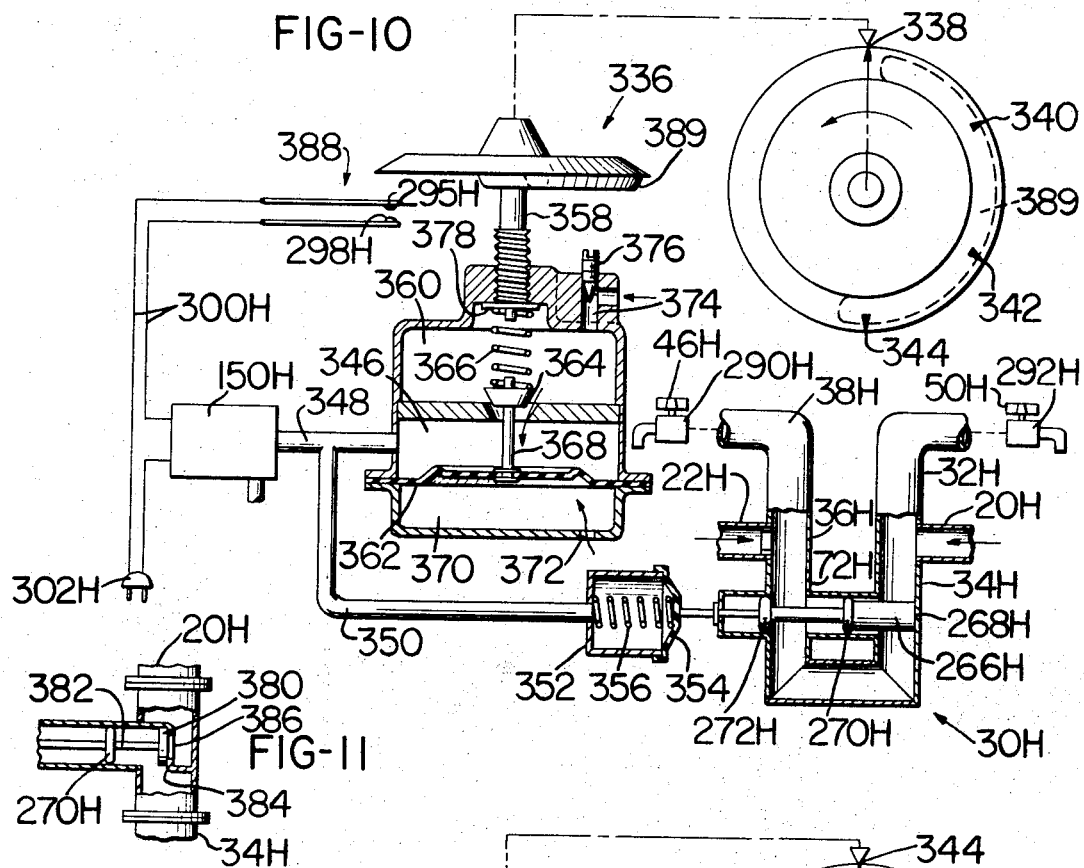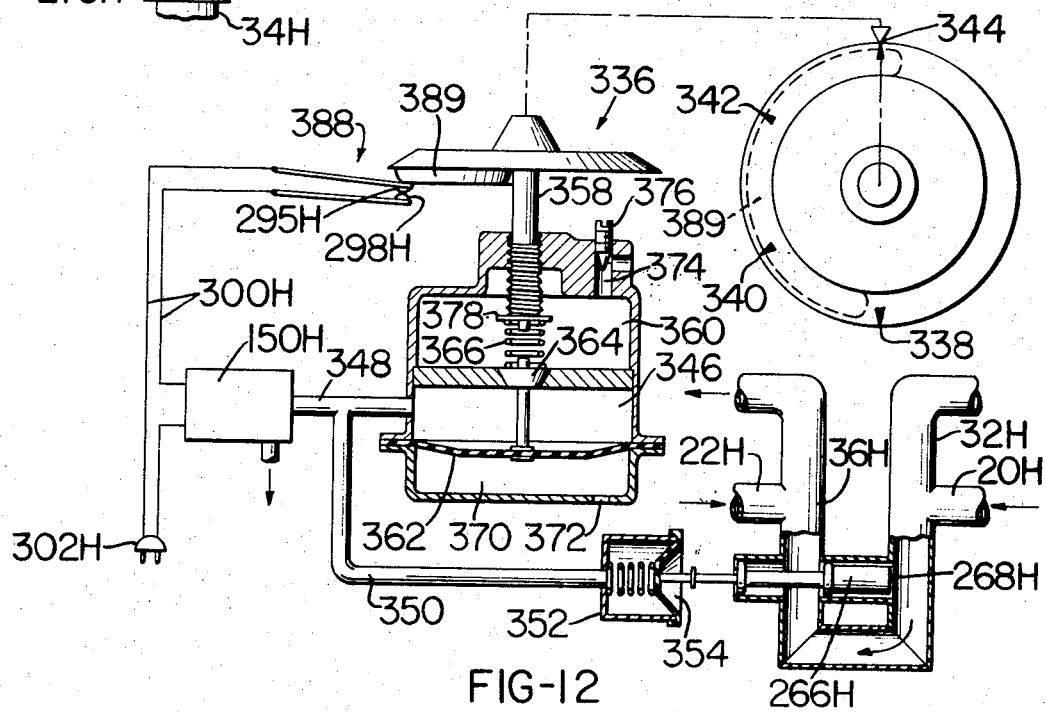

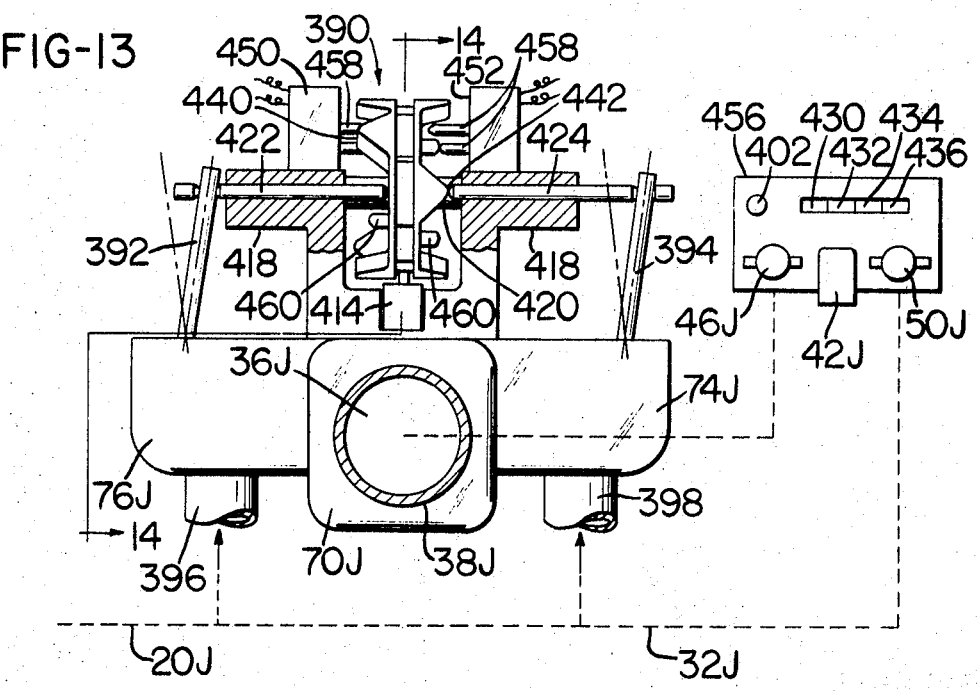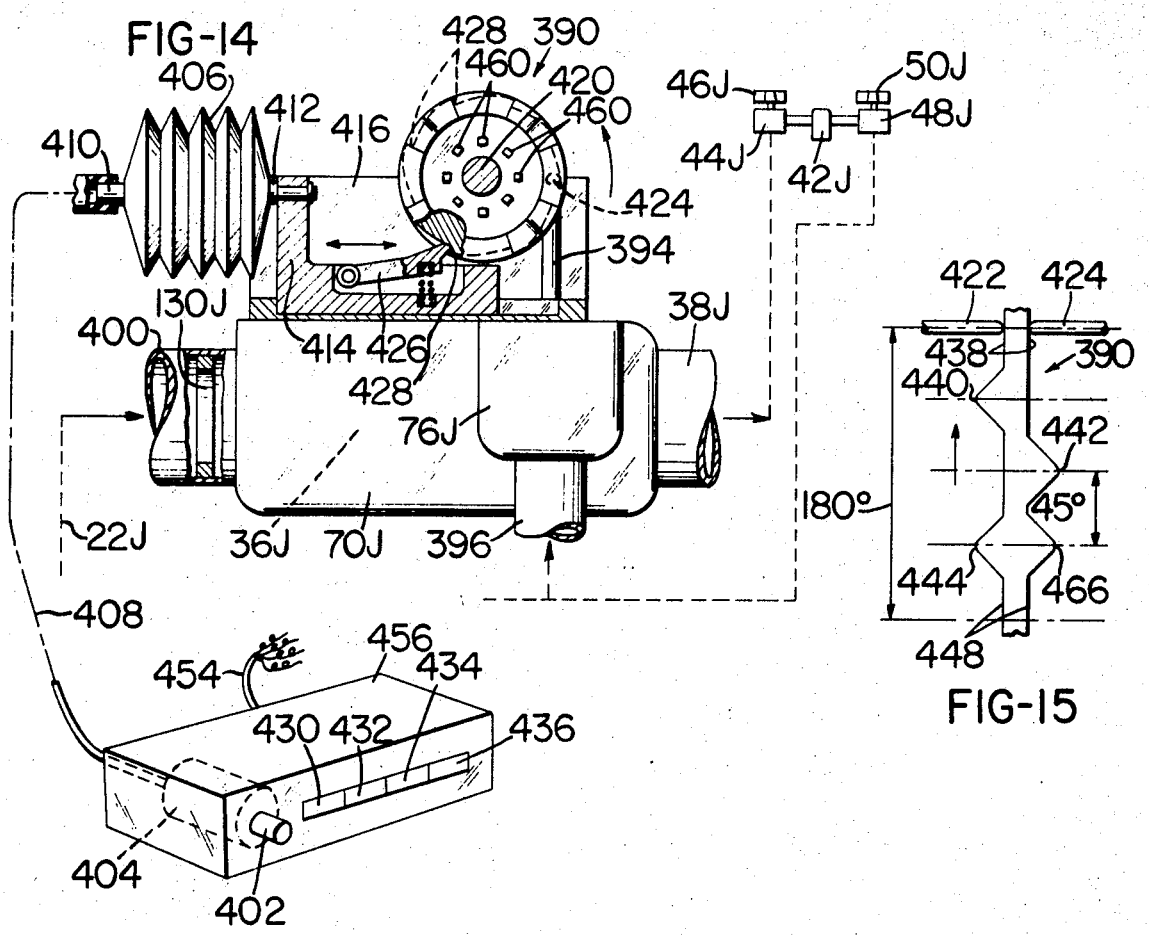

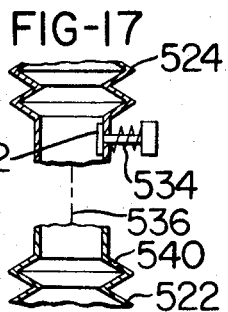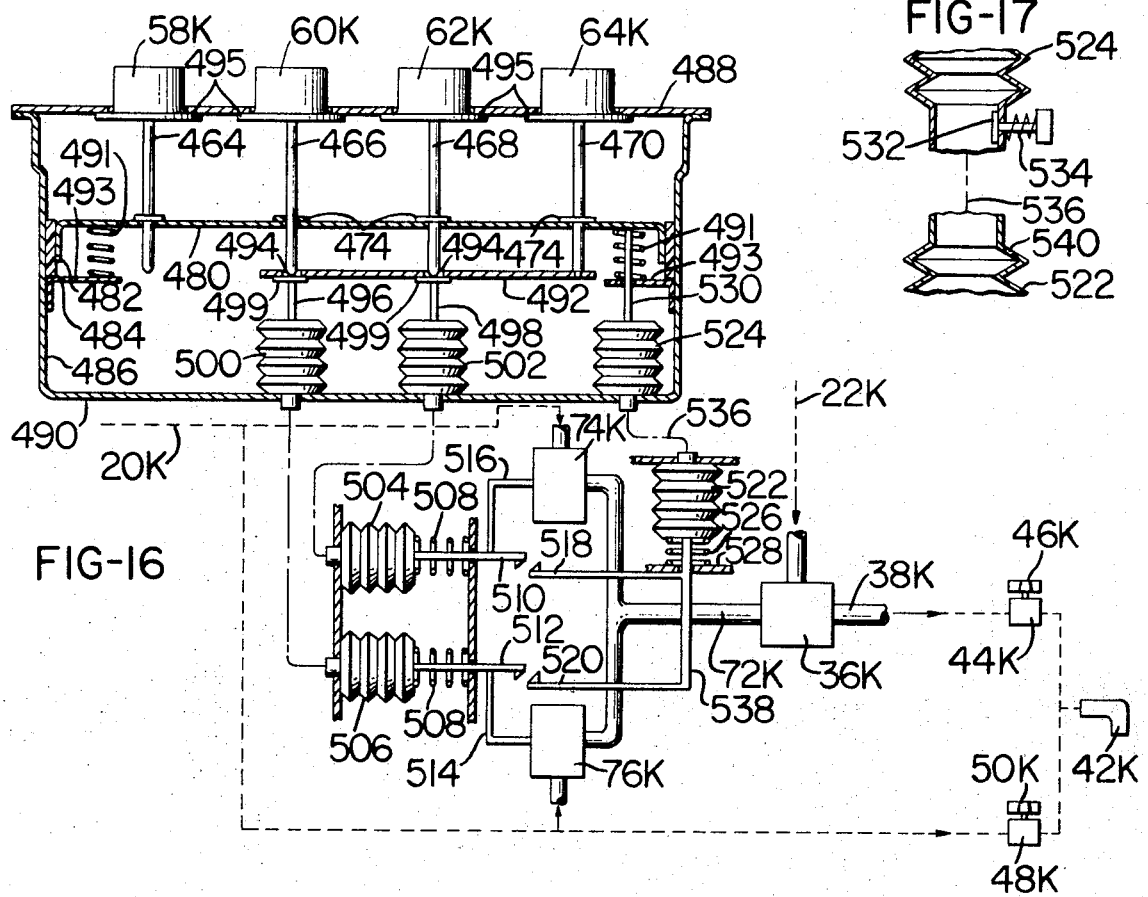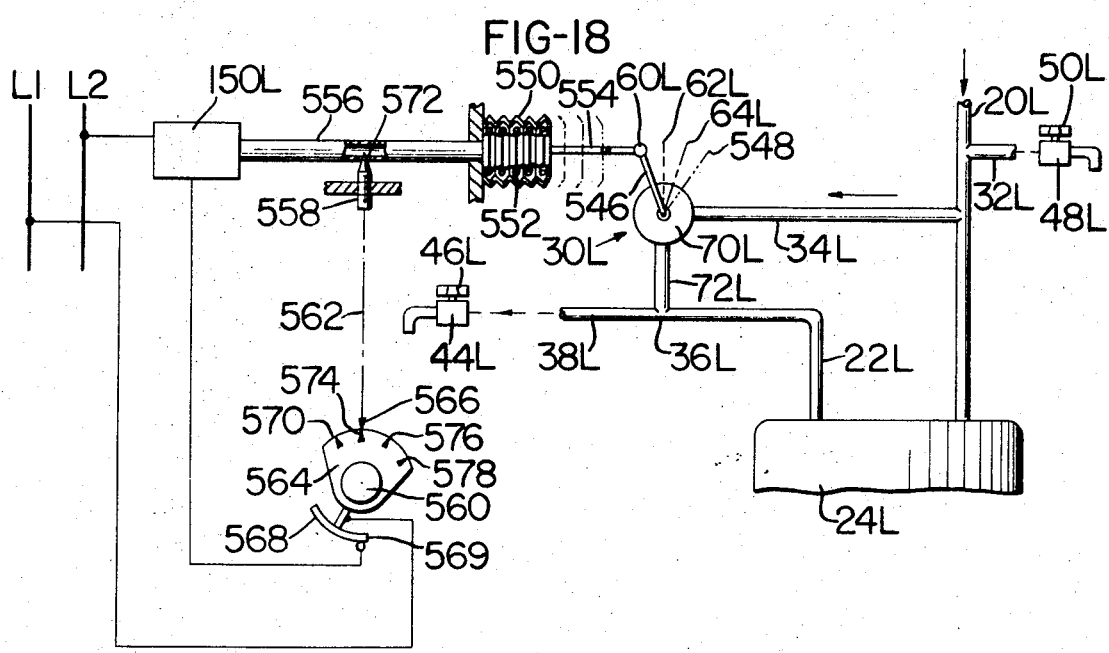

CONTROLLER AND MIXER OF PLURAL FLUIDS AND METHOD

This application relates to a controller and mixer of plural fluids and method.

A feature of this invention includes a regulated volume and temperature or mix valve construction, which may be manually operated, and which may be supplied with mixed fluids such as undiluted hot water, or hot water diluted with cold water in varying ratios, these ratios being determined by controls which may be selected by the user to determine the ratio supplied to such regulated valve. Also, if desired, a cold water valve is provided which may be supplied with cold water only. These valves may be operated by the user, each valve individually without the other, or both used together, if desired.

Another feature of this invention includes the use of the foregoing valve structures and mixing structures with a unitary construction which contains the two valves and a discharge construction such as a faucet construction, which may be a single faucet, or individual faucets for the two valves, and the like.

Another feature of this invention includes, for example, the use of a hot water valve for delivering hot water only, a cold water valve for delivering cold water only and a mixed hot and cold water valve for delivering mixed water only, the mixed water valve being combined with a hot and cold water mixing construction which is controlled by mixture controlling manipulating means.

Another feature includes the three valves of the preceding paragraph in combination with three separate faucets, or the like, or with a single common faucet or the like for the valves.

The following disclosure specifically discloses a hot and cold water controller. It is to be understood that many of the features herein disclosed are also applicable to other plural fluids and come within the purview of this invention.

Other features are apparent from this description, the appended claimed subject matter, and/or the accompanying drawings in which:

FIG. 1 is a perspective view of a unitary construction provided with a regulated volume and temperature valve and handle, a cold water valve and handle, a selecting button structure, and a unitary faucet construction for use with this invention.

FIG. 2 is a diagrammatic view showing showing a water control system for use with any delivering or discharging construction, such as the one shown in FIG. 1.

FIG. 6 is a diagrammatic view showing a modification of FIG. 5, including plunger means for controlling the mixing of cold water with hot water.

FIG. 7 is a diagrammatic view showing a modification of FIG. 4, including control means for the vacuum pump, separate valve and faucet constructions, and pilot plunger and diaphragm constructions for controlling the flow of cold water.

FIG. 8 is an enlarged detail view of a portion of FIG. 7.

FIG. 9 is a diagrammatic view showing a modification of FIG. 7 including vacuum breaking means for the vacuum motors.

FIG. 10 is a diagrammatic view showing a modification having a plunger construction somewhat similar to that of FIG. 6 and including a dial construction for controlling such plunger construction and operation of the vacuum pump.

FIG. 11 is a diagrammatic cross section showing a modification of the plunger construction of FIG. 10.

FIG. 12 shows another position of FIG. 10.

FIG. 13 is a diagrammatic view showing a rotatable cam wheel construction for regulating the mixture of cold water with hot water and including visible signals to indicate the position of the wheel.

FIG. 14 is a diagrammatic transverse view of FIG. 13 taken generally along the line 14–14, and showing the push button and signal construction for operating and indicating the operation of the cam wheel.

FIG. 15 is a development chart of part of the hills and valleys of the cam wheel of FIGS. 13 and 14.

FIG. 16 is a diagrammatic view showing a modification of FIGS. 2 and 3.

FIG. 17 is a diagrammatic enlargement of part of FIG. 16.

FIG. 18 is a diagrammatic view showing an embodiment having a different cold water mixture valve, a single bellows for operating such valve, and modified dial and vacuum pump constructions.

FIG. 20 is a diagrammatic view showing another embodiment for controlling a plunger construction somewhat similar to that of FIG. 6, and using only three push buttons and having three manually operable valve and faucet constructions.

Figure 3:
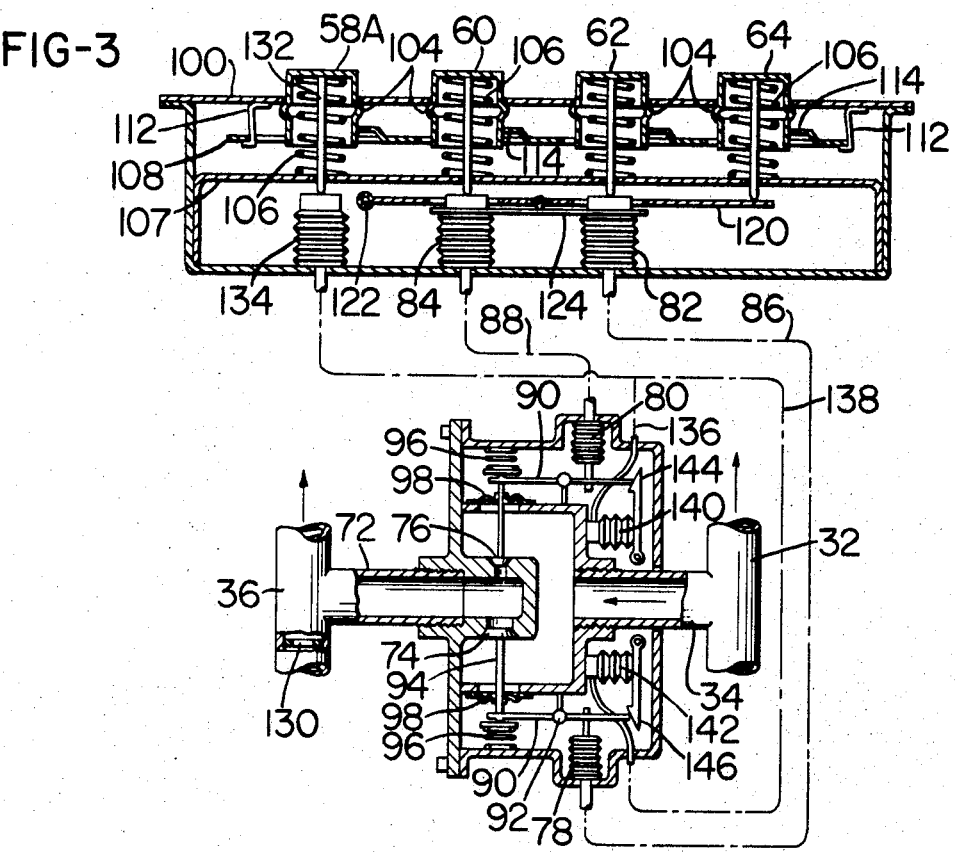
FIG. 3 is a diagrammatic view showing a modification of a portion of FIG. 2 including latch means.

Certain words may be used in this specification and in the appended claimed subject matter describing direction, relative position, and the like. Such words are used for the sake of clearness and brevity. However, it is to be understood that such words are used only in connection with the views of the drawings, and in actual use, the elements designated by such words may have entirely different direction, relative position, and the like.

In adopting reference numerals for the various means and elements disclosed in the drawings, numerals are used with or without different suffixes such as alphabetical suffixes A, B, C, etc. Whenever such reference numerals are used, it is intended to indicate that there is a similarity between the elements so designated and other elements having the same number without a suffix or with suffix. The purpose of this numbering is to inform that a reasonable similarity exists and need not be described in detail, and that the similarity is sufficiently clear to those skilled in the art for them to realize the similarity of construction and operation of such means or elements. Because of this similarity, such elements may not be further described, as where the construction and operation are obvious from the context.

Referring to FIGS. 1 and 2, this invention is disclosed, for example, specifically to be used in combination with any usual cold water supply means 20, such as is to be found in a dwelling, office building, apartment building, and the like. Also, a hot water supply means, or hot water discharge pipe 22 may also be provided. Such hot water supply means or hot water discharge pipe 22 may be any such hot water supply or pipe to be found in such dwelling, office building or apartment building and the like. For example, a cold water supply means 20 may be connected to any usual hot water heater or hot water heater means 24. Such hot water heater or hot water means 24 may be thermostatically controlled, to maintain the hot water in such heater at a substantially constant temperature, within reasonable limits, as is well known. For example, such heater may be heated by an electric heater 26, which is controlled by a usual adjustable thermostat 28 which connects and disconnects the electric heater 26 from the power supply, such as lines L' and L" in any well known manner.

A water mixing means 30 may be connected to the cold water supply means 20, for example, through the medium of a cold water pipe 32 and through the cold water inlet flow means 34, which delivers cold water, under proper conditions, from the cold water supply means 20 into the water mixing means 30 which is a cold water variable regulating flow means, which delivers regulated quantities of cold water to the cold and hot water junction means 36 in or associated with the hot water supply means, or discharge pipe 22, to provide heated water of regulated temperature in the regulated water pipe 38. The pipe 38 may be connected to a water dispensing faucet means 40, FIG. 1, which may have, for example, a single spout 42 for dispensing the water which is supplied to the faucet means 40.

The regulated hot water pipe 38 may be connected to an on and off hot water valve 44, which may be opened and closed by the handle or knob 46 for causing regulated temperature and volume undiluted hot and mixed hot and cold water from the pipe 38 to be delivered to the spout 42 when desired. The valve 44 may be of the usual type, which can also regulate the volume of flow of the regulated water, by regulating the passageway size in the valve 44, so that water of the desired temperature and the desired volume is delivered from the valve 44 into the spout 42 and from which it is discharged for use. If desired, the handle or knob 46 of FIG. 2 may be identical with the handle or knob 46 of FIG. 1. However, if desired, a cold water pipe or extension 32 may be connected to a cold water valve 48, which may be an on and off and variable volume valve to cause cold water to be directed into the spout 42 in regulated volume, produced by the turning and adjustment of the handle or knob 50, which can cause cold water to be delivered to the spout 42, through the pipe 52, which delivers the cold water to the spout 42. The warm or hot water from the pipe 38 and valve 44 may be delivered by the pipe 54 to the spout 42.

The connection of the pipes 52 and 54 to the spout 42 may be of any well known construction. It is to be understood that the illustrations of the valves 44 and pipes 52 and 54 are diagrammatic, and that these valves may be any well known construction of separate valves or of a unitary construction, such that the water entering from pipe 38 and from pipe 32 may be selectively regulated by manipulation of the knobs or handles 46 and 50.

According to this invention, if the user so desires, he may open or manipulate only the handle 46 and cause the normally hot water valve 44 to be opened to provide the desired volume discharge at the spout 42. He need not open the cold water valve 48 or manipulate the handle 50. Instead he may manipulate the manually operable normally heated water control means 56, which may include a plurality of push button means 58, 60, 62, and 64. The means 56, or the push buttons 58, 60, 62 and 64, are means controlling the volume and temperature flow of water out of the faucet means or spout 42 from the hot water supply means or pipe 22, from the mixing means 30, and from the cold water valve means 48 so that the temperature of the water will be as desired, depending upon which one of the push buttons is pushed in, and which valves are manipulated.

The mixing means 30 is of such a construction that it regulates the amount of cold water passing from the inlet 34 to the junction means 36 at the junction of the hot water pipe 22, so that the desired proportion of mixture of hot and cold water is provided in the regulated water pipe 38, depending upon which one of the push buttons 58, 60, 62 or 64 is pushed in.

For example, pushing in of the push button 58 causes "very hot" water, or undiluted hot water, to be discharged from the spout 42, since only hot water from the pipe 22, without any mixture of cold water, is delivered at the spout 42 when the push button 58 is pushed in, with the valve 44 opened to the desired degree by manipulation of the handle 46, and without opening of the cold water valve 48.

If the push button 60 is pushed in, with the valve 44 opened to the desired degree, and the valve 48 closed, then a "hot" mixture of water is delivered at the spout 42 which may still be considered hot, since only a small amount of cold water has been delivered to the junction 36 by the regulating means 30. If a "medium hot" water is desired, then the push button 62 is pushed in, which causes a slightly greater amount of cold water to be introduced into the junction 36, so that hot water with more cold water mixed therein is delivered at the spout 42. If "warm" water is desired, with a maximum amount of cold water mixed therein, then the push button 64 is pushed in, so that a greater proportion of cold water is mixed at the junction 36 under the control of cold water regulating means 30.

The construction is such that when any one of the push buttons 58, 60, 62 or 64 is pushed in, any previously pushed in button is released, and only the newly pressed button is retained in position to deliver the desired temperature of water. This is of great advantage when it is desired to obtain water of a desired temperature, with a varying volume and the like. For example, the user may push in any one of the buttons 58—64 for the desired proportion of hot and cold water, and he may then regulate the volume by manipulating the knob 46, without at the same time trying to regulate the second knob 50, since such knob 50 can be retained in its closed position.

On the other hand, it may be desired to obtain cold water only, in which case the knob 46 is turned to off position and the knob 50 is opened to any desired degree to obtain such cold water out of the spout 42 at the desired volume. Likewise, hot water, without dilution of cold water, may be obtained by turning the handle 46 to an open position, of desired volume, and pushing in push button 58, which causes hot water, unmixed with cold water, to be delivered to the spout 42.

This construction is also useable in connection with a shower head or the like, which may be substituted for the spout 42, as is readily apparent.

Further details of FIGS. 1 and 2 may include a cold water inlet pipe 66 for the heater 24, which pipe 66 may be an extension of the cold water supply 20, or an extension of the pipe 32. A hot water outlet 68 from the water heater 24 may also be provided, which may be connected to the hot water pipe 22 previously described.

In general, the water mixing means 30 may include the cold water inlet 34, a cold water flow regulating means or chamber 70, a cold water outlet means or pipe 72 from the chamber 70 which is connected to the hot and cold water junction means 36.

The chamber 70 may have relatively large and small valve means 74 and 76, respectively which may be selectively opened by inward manipulation of the push buttons 60 and 62 respectively. The construction is such that when the push button 60 is pushed in, the small valve 76 is opened while the large valve 74 remains closed. This allows a relatively small amount of cold water to flow from the inlet 34, through the small valve construction 76, through the outlet 72 and to the junction 36 to produce a relatively hot mix of hot and cold water at the junction 36.

On the other hand, if the push button 62 is pushed in, this releases any previously pushed in button and opens the valve construction 74, which is relatively large, and allows a relatively greater amount of cold water to flow from the inlet 34, through the outlet 72 and into the mixing junction 36. A "medium" hot water is provided in pipe 38 and is discharged at the spout 42.

If the push button 64 is pushed in, then any previously pushed in button is released, and then both of the valve constructions 74 and 76 are opened, so that the maximum amount of cold water is allowed to flow from the water inlet 34 to the outlet 72 and to the junction 36. This causes "warm" water to be discharged at the spout 42.

Power members or bellows 78 and 80 may be provided to open and close the valves 74 and 76. Power actuating members or bellows 82 and 84 may be provided to actuate or energize the power members 78 and 80. These members 78, 80, 82 and 84 may contain any well known power fluid, such as one which remains in liquid phase at all temperatures likely to be encountered in this apparatus, and which is well known in the art. These members 78, 80, 82 and 84 may be connected by suitable fluid transmitting pipes 86 and 88.

The bellows 78 expands when button 62 is pushed in and pushes up on right end of lower lever 90 and rocks the lever about a pivot 92, and which pulls down a stem 94, which is connected to the valve 74. A compression spring 96 maintains the valve 74 normally closed when the valve member 78 is not energized but yields if the power member 78 is energized by the compression of the bellows 74 in response to actuation of button 62. A suitable flexible seal 98 is provided to prevent water from flowing along the stem 94.

The actuation of the valve 76 by downward actuation of button 60 is identical with that just described in connection with the button 62 and valve 74, except that the valve 76 is opened upwardly, and it is believed unnecessary to describe the operation of the corresponding lever 90, pivot 92, stem, and spring 96 constructions, heretofore described in connection with valve 74.

The water control means 56 may be in the form of a front panel 100 having proper openings 102 through which the buttons 58—64 freely pass. Each of said buttons has an outward limiting rib 104 to limit outward movement of such buttons past the openings 102.

The buttons may be hollow cups, which may be square or round, receive the springs 106, which upwardly urge the buttons 58—64. The lower ends of springs 106 are supported by stationary horizontal plate 107. A leftwardly biased plate 108 has suitable openings 110, which are large enough to allow the buttons 58—64 to pass therethrough and to allow the plate 108 to move rightwardly and leftwardly in FIG. 2. The plate 108 may be supported from the front panel 100 by means of the leftwardly biased leaf springs 112 which support and leftwardly bias the plate 108. The plate 108 has button locking latches or lipe 114, which cause the plate 108 to yield rightwardly and allow the respective rib construction 104 to pass downwardly past the latch 114, but which hold the rib construction 104 in a down position underneath the latch 114, when such button is released, so that the pressed in button remains in until it is released by the pressing of some other button. When another button is pressed in, its rib moves its respective latch 114 rightwardly a sufficient distance so that any previously pushed in button will have sufficient spring force to cause such button to push upwardly to its top position as the releasing button is being pushed downwardly to lock it in position.

The buttons 60 and 62 have stems 116 and 118 which respectively press down on the bellows 84 and 82 when the respective buttons 60 and 62 are pressed down.

A construction is provided which causes the button 64 to push down both of the bellows 82 and 84 when the button 64 is pushed down. This may include a lever 120, which is pivoted at 122. A plate 124 engages both of the bellows 82 and 84. The plate 124 is pivoted to and is actuated by a link 126 which moves the plate 124 and the bellows 82 and 84 down when the lever 122 is pushed down by the stem 128 and button 64. The construction is such that downward movement of the button 64 releases any other previously pushed down button and causes bellows 82 and 84 to be compressed and correspondingly causes the bellows 78 and 80 to be compressed, simultaneously to open the valves 74 and 76. This causes the maximum amount of cold water to be delivered through the outlet 72 into the mixer or junction means 36, to provide "warm" water in the pipe 38 and valve 44.

In the operation of the apparatus shown in FIGS. 1 and 2, cold water is supplied by the cold water means 20 to the water heater 24. Water from the heater 24 passes through outlet 68 to the hot water pipe 22 and, if desired, through a restricting orifice 130 which tends to restrict the passage of hot water through such restrictor 130 sufficiently to slightly reduce the pressure of the hot water at the junction 36 with respect to the pressure of the cold water in the pipe 32. The user may open the valve 44 by handle 46, which causes water from the junction 36 and pipe 38 to flow through the valve 44 and into the faucet 42, while the cold water valve 48 can be maintained closed, if desired. The user may select the temperature of the water to be discharged through the faucet 42 merely by selectively pushing in any of the push buttons 58, 60, 62 and 64 and opening valve 44 for the desired volume. If he pushes button 58 inwardly, this releases any previously pushed buttons 60, 62 or 64, and causes the valves 74 and 76 in the regulator 70 to be closed, so that no cold water is introduced into the junction means 36. Hence, undiluted hot water from the heater 24 is delivered without mixture of cold water and is discharged at the faucet 42. If the user pushes the button 60, while the valve 44 is opened and the valve 48 is closed, small valve 76 is opened, and a small amount of cold water is caused to flow from the cold water pipe 32 through the cold water regulating means 70 and through outlet 72 to the junction means 36, so that a slight amount of cold water is mixed with the hot water which is discharged through the faucet 42. This water will be of a definitely hot temperature only slightly cooler than that provided by push button 58. If the user selects button 62, the other buttons are released, the large area valve 74 is opened, so that a larger amount of cold water is mixed at the junction means 36 to be delivered in a "medium" hot condition through the faucet 42. If the user selects the push button 64, the other push buttons are released and both valves 74 and 76 are opened, so that the maximum amount of cold water is allowed to flow through regulating means 70, so that the mixture of hot and cold water reaching the faucet 42 is merely "warm". If the user desires cold water only, he closes the valve 44 by the handle 46 and opens the valve 48 by the handle 50. If the user desires hot water only he closes the valve 48 and opens the valve 44 by manipulating the handle 46 and pushing the push button 58 in, which releases the cold water mixing buttons 60, 62 and 64 and causes hot water unmixed with cold water to be delivered at the faucet 42. It is understood that the faucet 42 may, if desired, be any other discharge or water using apparatus which is to receive water, such as a shower head, washing machine or the like.

The push button structure 56, without the faucet 42 and valves 44 and 48, but with cold water regulator 70, may be located near the water heater. This will permit immediate or temporary adjustment of the hot water temperature to be delivered from the water heater without adjusting the thermostat 28. This is very convenient for many purposes.

Also, it is understood that several valve and faucet constructions 40, of FIG. 1, may be connected with the hot water and/or cold water supply means, so that each faucet and valve construction 40 so supplied may be adjusted by pushing in the push buttons of that particular faucet construction, and so that each user may have a regulated maximum hot water temperature of his own desires. This is important where a central water heater 24 might have a thermostat 28 which provides undesirably hot water for one or more of the users who wish to have hot water of a limited high temperature only available at the faucet. Where each faucet construction is provided with its individual mixing and push button constructions, it is possible to obtain individually lower maximum hot water temperatures at each faucet, merely by keeping push button 60, 62 or 64 continuously pushed in. This is a relatively inexpensive method or construction for obtaining such result.

Under certain conditions, it may be unnecessary to use the restrictor 130 to obtain a pressure differential between the pipes 32 and 22 in order to obtain a flow of cold water through the regulator 30. Generally, such restrictor 130 may be omitted when the water pressure in the cold water pipe 32 is normally more than the water pressure in the hot water pipe 22, or when the pressure in pipe 22 quickly falls below that of pipe 32.

The construction of FIG. 3 is substantially the same as that of FIGS. 1 and 2. FIG. 3 shows a push button and mixing construction which can be combined with the faucet construction 40 of FIG. 1, substantially in the same manner as in FIGS. 1 and 2. However, the levers 90 of FIG. 3 are provided with a positive latching release means as will be described.

All of the parts of FIG. 3 may be substantially the same as in FIG. 2, except for the latching means to be described, which are released by inwardly pushing in button 58A.

Several of the parts shown in FIG. 3 have been provided with reference numerals identical with those of FIG. 2, to show that such parts and all other related parts are the same as in FIG. 2. It is believed unnecessary again to describe these parts or the associated parts, and how the water flow system may be connected to the dispensing or faucet construction of FIG. 1.

The push button 58A may be provided with an actuating stem 132 which can compress the bellows or power actuator 134, and which is connected by tubes 136 and 138 to the releasing bellows 140 and 142.

The levers 90 which actuate the water valves 74 and 76 may have right hand ends latched and unlatched by the latches 144 and 146. The bellows 140 and 142 may bias the latches 144 and 146 leftwardly, so that whenever the right hand ends of the levers 90 are moved inwardly by the bellows 78 and 80 respectively, the latches 144 and 146 will hook over the right ends of the levers 90 and hold them in actuated or latched positions, so that the right ends of levers 90 will be held in actuated positions even if there is a slow leak in the system.

Whenever it is desired to unlatch either of the levers 90 of FIG. 3, the push button 58A may be pushed in, which compresses or actuates the power element 134, which expands the inwardly biased bellows 140 and 142, so that the latches 144 and 146 are released, allowing the levers 90 to be actuated by the springs 96 to close either or both the valves 74 and 76. When the button 58A is pushed in, either of the ends of the levers 90 is released, if previously latched, and any pushed in button 60, 62 or 64 is also released. This is so since the button releasing actions produced by the rib constructions 104 are retained in all of the push buttons of FIG. 3.

Figure 4:
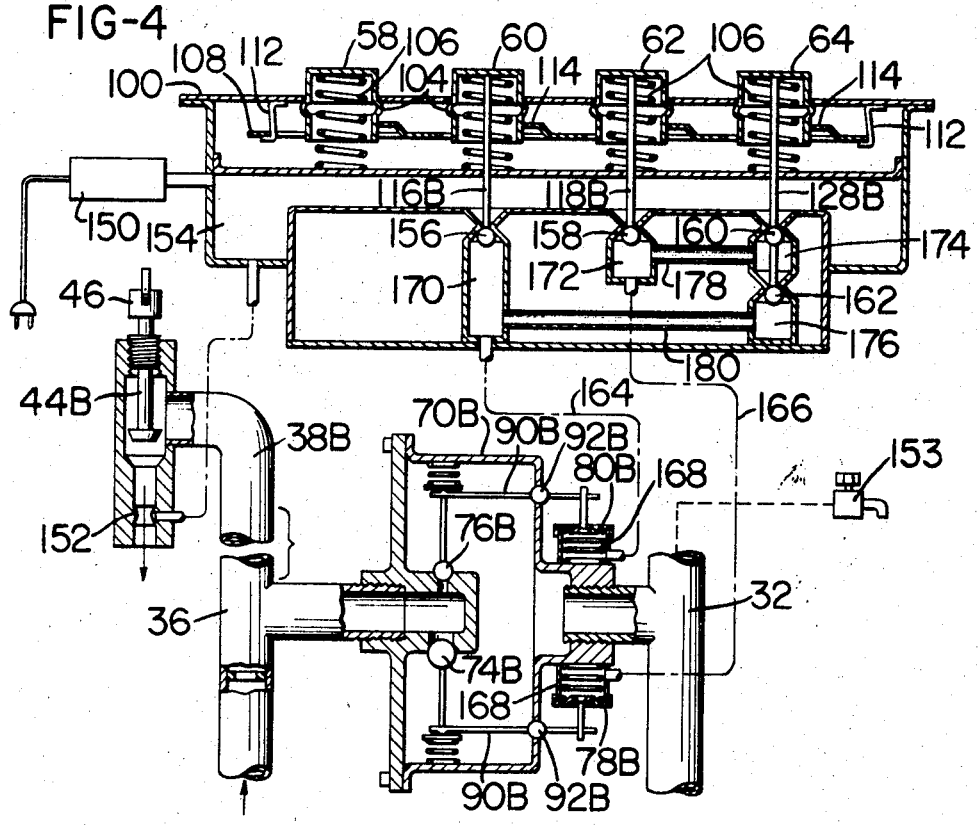
FIG. 4 is a diagrammatic view showing another modification of FIG. 2 including vacuum means for operating the cold water mixing means.

FIG. 4 shows an embodiment somewhat similar to the embodiments of FIGS. 1 and 2 in which the cold water flow valves 74B and 76B are actuated by vacuum means. The system of FIG. 4 may be combined with the structure of FIG. 1, if desired.

In FIG. 4 the buttons 58, 60, 62, and 64 and their support on the plates 100 and 108 may be substantially similar to those of FIG. 2. However, the stems 116B and 118B and 128B are constructed to connect a vacuum source or an electric motor actuated pump 150 with the valve actuating power members or diaphragm 78B and 80B for opening and closing the cold water valves 74B and 76B to control the mixture of hot water and cold water at the junction means 36. The resulting water condition in regulated water pipe 38B is the same as in FIG. 2.

The cold water pipe 32 and the general operation of the water flow of cold water through regulator 70B is controlled by the water valves 76B and 74B with substantially the same result as is obtained in FIG. 2. The hot water valve 44B and handle 46 may be substantially the same as in FIGS. 1 and 2, although specifically, the valve 44B has been shown as connected with an aspirator 152 which is used only if it is desired to substitute the aspirator 152 to produce the vacuum in chamber 154 to be described instead of the vacuum pump 150. If the vacuum pump 150 is used, then the valve construction 44B may be identical with that of FIG. 2. The aspirator 152 may be of any type construction that may be connected to the faucet 42B, if desired.

If desired the cold water pipe 32 may be connected to a combined cold water valve and faucet 153. Alternatively the valve 153 may discharge into a common faucet with valve 44B.

The vacuum pump 150, or the aspirator 152, may produce a vacuum in the chamber 154. The effect of this vacuum in chamber 154 may be controlled and transferred to the diaphragms 78B and 80B by means of the vacuum control valves or balls 156, 158, 160 and 162, which are actuated by the push buttons 60, 62 and 64.

The transfer of vacuum to the bellows 78B and 80B may be obtained through the vacuum transferring tubes 164 and 166. The levers 90B may be fulcrumed at sealed fulcrums 92B, and the stems of the diaphragms 78B and 80B may pull, instead of push, the right hand ends of the levers 90B inward with the application of a vacuum in such bellows. If desired, the diaphragms 78B and 80B may have inner springs 168 to bias them radially outward for outward return when the vacuum is broken. If necessary, a slow leak or slow bleed hole, not shown, may be provided in the diaphragm 78B and 80B to break their vacuum when their respective push buttons are released to close their valves 156—162.

In FIG. 4, when the push button 58 is pushed down, no vacuum transferring valve is opened, and therefore no cold water is introduced into the junction 36, and very hot water is delivered to the hot water valve 44B. When the button 60 is pushed down, it releases any other button which had been previously pushed down, and downwardly pushes stem 116B and opens the valve 156, so that a vacuum can be transferred from the vacuum chamber 154 to the chamber 170 and tube 164 to the diaphragm 80B to open the small water valve 76B and to produce the same type of mixed hot and cold water which was described in connection with button 60 in FIG. 2. When the button 62 is pushed down, it pushes down stem 118B and releases any previously pushed button. Then the vacuum from vacuum chamber 154 is transferred through opened valve 158 to the chamber 172, vacuum tube 166, bellows 78B to open the larger valve 74B and produce the type of hot and cold water mixture at the junction 36 that was produced by the button 62 of FIG. 2. When the button 64 is pushed down, it pushes down stem 128B and opens the vacuum valves 160 and 162, so that the vacuum can be transferred to the chambers 174, 176, vacuum tubes 178 and 180 to produce vacuums in the chambers 170 and 172. Vacuum is then produced in tubes 164 and 166 and in diaphragms 78B and 80B, to open the valves 74B and 76B and thus produce the type of water mixture in the junction 36 that was described in connection with the push button 64 in FIG. 2.

The cold water flow regulator chamber 70B has substantially the same function of controlling the flow of cold water from the pipe 32 to the junction means 36 that is produced by the regulator chamber 70 of FIGS. 2 and 3, except that the water valves therein are controlled by vacuum means instead of pressure fluid means.

In this manner, the operation of FIG. 4 may result in the same type of response to the operation of the push buttons 58-—64 that is produced as described in connection with FIGS. 1 and 2, insofar as the water flow is concerned. However, the specific means for producing this result is different.

Figure 5:
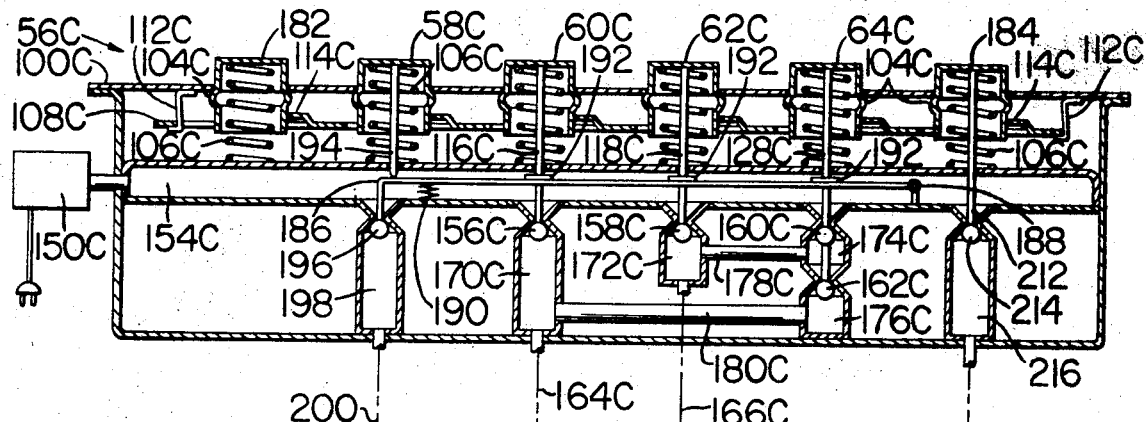
FIG. 5 is a diagrammatic view showing a modification of FIG. 4 including additional buttons and valves for controlling the flow of the hot water, cold water and mixed hot and cold water to a common faucet or discharge means.

In FIG. 5, the cold water supply means 20C may be connected to the cold water pipe 32C, and it is shown as downwardly directed for convenience in illustration. The water flows downwardly. The hot water supply means or discharge pipe 22C may be connected to or supplied by the usual hot water heater or supply means. Pipe 22C is also shown as downwardly directed. A hot and cold water junction means 36C and a restrictor orifice 130C may be provided, if required. The regulated water from 36C may flow through the pipe 38C to a valve construction 44C which controls the flow of water into the pipe 54C and into the common discharge means or spout 42C. The cold water pipe 32C discharges into the cold water valve construction 48C, which regulates the flow of cold water into the pipe 52C and into the common discharge or faucet 42C.

A control panel 56C may be provided, and, if desired, may be located adjacent to the faucet or spout 42C, to give the general appearance of the discharge means shown in FIG. 1, except that the handles 46 and 50 are omitted and six push buttons are provided instead of the four shown in FIG. 1.

The control panel means 56C will have a front panel 100C and an inner panel 108C substantially identical to the channel 100 and leftwardly biased plate 108 of FIG. 2. Slight variations are provided, which can be readily understood when not described.

All of the buttons may have rib constructions and upward biasing springs, etc., substantially identical to those disclosed in FIG. 2, to permit the push buttons to be pushed to obtain the desired operation and to release any previously pushed in button and to remain in pushed position and return by spring action as is obvious from the similarity of these parts in FIG. 5 to those of FIG. 2. There are additional buttons 182 and 184. Several of the elements of FIG. 4 are correspondingly shown in FIG. 5, and such parts are shown with the suffix C and it is believed unnecessary to describe them except where there is a slight dissimilarity. For example, there may be a vacuum pump 150C. The pump 150C (and all pumps herein disclosed) may be provided with automatic pressure responsive electrical controls which cause the pump to operate to maintain a desired vacuum pressure in the vacuum chambers 154 and 154C of FIGS. 4 and 5 respectively, and other vacuum chambers and the like. Push buttons 60C, 62C and 64C, FIG. 5, may also have stems 116C, 118C and 128C for opening and closing the vacuum valves 156C, 158C, 160C and 162C which operate substantially identically to those members without any suffix C in FIG. 4 to control the production of the vacuum in the chambers 170C, 172C, 174C and 176C to produce vacuums in a similar manner in the pipes 164C, 166C, 178C, 180C and in the vacuum diaphragm 78C and 80C that was produced in and described in connection with FIG. 4.

The construction of the chamber 70C in FIG. 5 may be substantially identical to that known and described in connection with FIG. 4, so that the pressing of any of the push buttons 60C, 62C and 74C produces the same action as to the mixture of water at the junction 36C as is produced by corresponding buttons 60, 62 and 64 of FIG. 4 and of FIG. 2.

A pivoted lever 186 may be pivoted at fulcrum 188. The lever 186 may be biased upwardly by the action of the vacuum valves 156C, etc., but the lever 186 may also be provided with any upward spring action required, such as 190. The stems 116C, 118 and 128C are provided with cross pieces 192, which push the lever 186 down whenever the corresponding button 60C, 62C or 64C is pushed down. Additionally, the button 58C is provided with a stem 194 which pushes the lever 186 down whenever the push button 58C is pushed down. The construction of the lever 186, is such that the vacuum valve 196 is opened whenever the push button 58C is pushed down as well as any of the push buttons 60C, 62C and 64C. The opening of the vacuum valve 196 imparts a vacuum action or pressure to the chamber 198, vacuum tube 200 and diaphragm 202. The diaphragm 202 moves the upper end of the lever 204 rightwardly and causes the water valve 206 to be opened whenever there is a vacuum imposed against the diaphragm 202. The lever 204 is fulcrumed or pivoted at sealed pivot 208 and is attached to the stem 210, which carried the regulated water valve 206 and opens the same as described. Therefore, regulated water is discharged through the regulated water pipe 38C past the valve 206 and into the discharge member or faucet 42C, whenever any of the push buttons 58C, 60C and 64C are pushed down.

The push button 184 causes cold water to be discharged into the faucet 42C. For this purpose the push button 184 is provided with a stem 212, which opens and closes the valve 214 and imparts a vacuum pressure to the chamber 216 and vacuum line or tube 218 which imparts a vacuum to the left side of diaphragm 220.

The diaphragm 220 operates the lever 222, stem 224 and cold water valve 226. Therefore, whenever the push button 184 is pushed down any previously pushed down button is released and the vacuum valve 214 is opened to impart a vacuum through the chamber 216, pipe 218 to the diaphragm 220 to actuate the lever 222, stem 224 and cold water valve 226 and discharge cold water from the cold water pipe 32C to the pipe 52C and to the faucet or common discharge 42C.

The push button 182 is a release button which releases any previously pushed down button.

In FIG. 5, to obtain undiluted very hot water, the push button 58C is pushed down to open valve 196 and produce a vacuum in chamber 198, pipe 200, behind diaphragm 202 to open valve 206. Hot water is discharged from the pipe 22C through the valve 206 and into the faucet 42C. To obtain hot water diluted by a selected proportion of cold water, the user can push any of the push buttons 60C, 62C and 64C and such diluted water will be obtained which is similar to the corresponding water obtained from the actuation of the buttons 60, 62 and 64 of FIGS. 2, 3 and 4. To obtain cold water undiluted by hot water, the push button 184 is pushed down whereupon a vacuum is imparted behind the diaphragm 220 which opens the valve 226 and cold water flows from the pipe 32C into the faucet 42C in cold undiluted condition.

The diaphragms 202 and 220 may be provided with springs 228 to return the respective valves 206 and 226 to close position when the vacuum is broken. The vacuum may be broken by a slow leak provided by an atmospheric bleed hole, not shown, in diaphragms 202 and 220, 78C and 80C.

Whenever plunger stems, button stems and the like are shown to pass through the walls of the vacuum chambers 154, 154C etc., it is to be understood that a sufficient sealing structure is provided to prevent any substantial leakage of air or water past said stems and the like.

FIG. 6 shows an embodiment somewhat similar to FIG. 5 in that it has six push buttons 182D, 58D, 60D, 62D, 64D and 184D. These push buttons operate to obtain substantially the same water flow results as in FIG. 5. The chambers 170D, 172D, 274, 276, 198D and 216D and tubes 178D and 180D obtain the same water flow results, but the details of their construction are different. Also, the lever 186D operates the same as in FIG. 5 in connection with the push buttons 58D, 60D, 62D and 64D. However, the fulcrum 188D has been extended to the right beyond the stem 212D and a cross piece 238 has been secured to the stem 212D so that it will not be engaged by the lever 186D when the push button 58D is pushed down, but will be engaged when the push buttons 60D, 62D and 64D are pushed down. This is accomplished by the fact that the lever 186D is too long for the push button 58D to actuate the stem 212D, but is short enough to actuate such stem 212D when the closer push buttons 60D, 62D and 64D are pushed down.

The construction is such that pushing down button 58D produces a vacuum behind the upwardly spring pressed diaphragm 240 and opens the hot water valve 242, while the cold water valve 245 remains closed. This causes hot water undiluted with cold water to be delivered to the faucet 42D from the hot water supply means or pipe 22D. When the button 184D is pushed down, it produces a vacuum under the upwardly spring pressed diaphragm 244 and opens the cold water valve 245. The valve 245 controls the flow of cold water from the cold water pipe 32D. The construction is such that cold water may be supplied to faucet 42D undiluted with hot water, if the push button 184D is pushed down and remains down.

Also, cold water from valve 245 and pipe 32D may be mixed with hot water from pipe 22D and valve 242 in varying proportions by pushing down any of the buttons 60D, 62D and 64D, as will become apparent.

When push button 60D is pushed down it causes a vacuum to be produced in the vacuum responsive motors 246 and 248 which are connected to the connecting rods 250 and 252 respectively. These connecting rods are connected to a lever 254, which has a short end 256 and a long end 258. The lever 254 is connected to a connecting rod 260 which is leftwardly biased by the spring 262 acting on the cross piece 264. The connecting rod 260 laterally reciprocates the plunger construction 266 which has a cold water throttling end 268 in pipe 52D. This end 268 controls the ratio of cold water to be mixed with hot water when the plungers or buttons 60D, 62D and 64D are pushed down. The throttling end 268 may be in the position illustrated in FIG. 6 when no button is down, and when any of the buttons 182D, 58D and 184 are down. The throttling end 268 may be in its right most throttling position when the button 60D is pushed down, and this mixes the minimum ratio of cold water to be mixed with the hot water to provide "hot" water. The end 268 may be in an intermediate position of pipe 52D when the button 62D is pushed down to mix an intermediate ratio of cold water with hot water to provide "medium hot" water. The end 268 may extend the minimum distance into the pipe 52D when the button 64D is pushed down, to mix the largest ratio of cold water with hot water to provide "warm" water.

The plunger construction 266 has a pair of guiding discs 270 and 272 on each side of the regulated water pipe 52D.

Any construction may be used to obtain the actuation of the plunger construction 266 in response to the button actuation, to obtain the foregoing results.

For example, the push button 60D has stem 194D, which extends into the upper and lower cavities 274 and 276. Vacuum controlling valves 278 and 280 seal and unseal the cavities 274, 276 from the vacuum chamber 154D in response to the actuation of the button 60D. The construction is such that the cavities 274 and 276 are sealed from the vacuum chamber 154D when the push button 60D up, and are connected to the vacuum chamber 154D when the push button 60D is down. Tubes 178D and 180D connect the cavities 274 and 276 to cavities 172D and 170D respectively. Hence a vacuum is also produced in cavities 172D and 176D when push button 60D is down.

The result is that when the push button 60D is pushed down then the vacuum is transferred from the vacuum cavity 154D to the cavities 274, 276, tubes 178D, 180D and cavities 172D and 170D and to the vacuum tubes 282 and 284, which are connected respectively to the bellows 246 and 248. This causes the bellows to move the connecting rods 250 and 252 to their right most position. This places the end 268 at its right most position in the water tube 52D to mix the minimum or hot ratio of cold water with hot water which is mixed and delivered at the faucet 42D.

When the push button 62D is pushed down the vacuum valve 158D is opened by the stem 118D and a vacuum is transferred from the cavity 154D into the cavity 172D and through the vacuum tube 282 to the bellows 246, while the bellows 248 has had its vacuum eliminated, so that the connecting rod 250 is moved rightwardly and the connecting rod 252 is moved to a leftward most position, which may be established by suitable abutment construction for the bellows 246 and 248.

This procedure causes the throttling end 268 to move to an intermediate position in the pipe 52D to produce the medium ratio heretofore described for the hot and cold water to be produced by the push buttons corresponding to 62D.

When the push button 64D is pushed down, this causes the stem 128D to be pushed down to open the vacuum valve 160D while the valves 158D, 278 and 280 remain closed. This causes the vacuum to be transferred from the chamber 154D to the pipe 284 and to the bellows 248 to contract the same, while the bellows 246 is expanded to its left most position because its vacuum has been previously broken. This causes the connecting rod 250 to be at its left most position, and the connecting rod 252 to be at its right most position. Because of the difference in length of the ends 256 and 258 of the lever 254, the throttling end 268 is pulled leftwardly to the "warm" water position in pipe 52D. This difference is accomplished because of the difference in length of the lever ends 256 and 258. The result is that the push button 64D produces a cold and hot water mixture with the highest ratio of cold water to hot water, which is a warm water ratio.

The button 58D has a stem 193D which pushes down the lever 186D. Suitable cross pieces 192D are provided in the stems 194D, 118D and 128D so that the lever 186D is pushed down whenever any of the push buttons 60D, 62D, 64D are pushed down, which cause the lever 186D to engage the cross piece 238 and open the vacuum valve 214D to open the cold water valve 245 whenever any of the buttons 60D, 62D, 64D are pushed down. Also, valve 214D is opened when the push button 184D is pushed down, without affecting any of the other push button actions. The lever 186D is sufficiently long, so that the push button 58D cannot push the lever 186D far enough to engage the cross piece 238, so that undiluted hot water is delivered when the push button 58D only is pushed down. The lever 186D has a spring 190D to bias or push it up when it is not actuated downwardly by the push buttons 58D, 60D, 62D and 64D.

FIG. 7 shows substantially the same construction as is shown in FIG. 4 without the aspirator construction 152 of FIG. 4, and with the hot water regulated line 38F and the cold water line 32F connected to separate combined valves and faucets 290 and 292, which may be respectively a hot water regulated valve faucet and a cold water valve faucet. Additionally, means are provided for causing the vacuum pump 150F to operate only when the push buttons 60F, 62F and 64F are pushed down. This is accomplished by providing an insulated lever 294 which is actuated by cross pieces 296 which are provided on the stems of the push buttons 60F, 62F and 64F. The lever 294 may be provided with movable contact 295 which may engage a stationary insulated contact 298. The contacts 295 and 298 may be connected to the electric lines 300 in a manner to make and break one or both of the electric lines to the motor of the vacuum pump 150F between the plug-in connector 302 and such motor. This breaks the electric connection to the motor as long as the push buttons 60F, 62F and 64F are up and connects the motor to the plug-in connector 302 when those push buttons are down.

The feature of energizing and deenergizing the motor or the vacuum pump shown in FIG. 7 may be applied to the vacuum pumps in all the other FIGS. in an obvious manner in view of this disclosure.

FIGS. 7 and 8 also show pilot plungers 304 for opening and closing the diaphragms 308 which control the flow of cold water through large and small openings 74F and 76F in regulating means 70F.

The pilot plungers 304 open and close the high capacity openings 306 in the flexible diaphragms 308. The diaphragms 308 may be provided with one or more small capacity orifices 310 which permit the cavities 312 in regulating means 70F to have their water pressure gradually made to correspond with the pressure of the cold water pipe 32F. When any of the buttons 60F, 62F and 64F are pushed down, they produce vacuums under the diaphragms or power members 78F and 80F to operate the levers 90F and operate the pilot plungers 304 outward axially substantially in the same manner as previously described in connection with the previous embodiments. Pressing down of button 60F opens the upper plunger 304 which then opens the large capacity orifice 306 and releases the pressure in the chamber 312 so that water from the cold water pipe 32F may flow through the low volume orifice 76F to the junction member 36F substantially as previously described in connection with FIG. 4. In the same manner the push button 62F operates the vacuum member 78F which in turn operates the lower pilot plunger 304 axially outward and opens the lower diaphragm substantially in the same manner. The principle of the pilot plunger and diaphragm operation is well known, per se, and is illustrated and described in many patents, such as in the U.S. Pat. to Wantz, 3,192,782, granted July 6, 1965.

In the operation of the embodiment of FIG. 7, downward push of any of the buttons 60F, 62F and 64F energizes the motor of vacuum pump 150F. The pilot plungers 304 are opened and closed selectively by the push buttons 60F, 62F and 64F to cause various mixtures of hot and cold water to be delivered to faucet and valve 290 where the volume flow may be regulated by knob or handle 46F. Downward push of button 58F causes undiluted hot water to be delivered to faucet 290. Undiluted cold water is always supplied to faucet 292 where the volume may be controlled by a built-in valve operated by handle 50F.

FIG. 9 discloses a construction in which the vacuum in chamber 154G may be produced by the vacuum pump 150G. The buttons 58G, 60G, 62G and 64G operate substantially in the same manner as in previously described embodiments, for example, as in FIG. 2, to open passageways to the small water flow orifice 314 or the large water flow orifice 316 to provide mixtures of hot and cold water are previously described by the application of vacuum in the chambers 78G and 80G, through pipe lines 86G and 88G. The push buttons 60G and 62G and their respective items 116G and 118G operate slidable valves 156G and 158G which slide in chambers 170G and 172G and are sealed to the sides thereof, so that vacuums from the vacuum chamber 154G pass through orifices 317 surrounding the stems 116G and 118G. These valves 156G and 158G slide downwardly past the pipe openings 318 and 320 which are connected respectively to the pipes 88G and 86G and vacuum motors 78G and 80G. When the valves 156G and 158G slide past the connections 318 or 320, the vacuum from chamber 154 is transferred respectively to such pipes and to the vacuum motors 78G and 80G in the same manner as previously described. Atmospheric pipes or orifices 322 and 324 are connected to the chambers 170G and 172G, so that atmospheric pressure may flow through the connections 318 and 320 when the valve 156G and 158G are above the connection, but may not flow when the valves 156G and 158G are below the connections. In this manner, when the stems 116G and 118G are pushed down by buttons 60G and 62G, vacuum is imposed on the chamber 76G and 80G respectively, and when the valves 156G and 158G are up, atmospheric pressure is supplied to these chambers 78G and 80G and thus the vacuum is broken. In this manner, a quick method of breaking the vacuum in the respective chambers 78G and 80G is provided without providing a slow leak or the like for breaking such a vacuum. It is understood that when button 64G is pushed down the stem 128G operates the lever 120G which is pivoted at 122G. The lever 120G pushes down on cross pieces 326 on the stems 116G and 118G, so that both stems are pushed down when the button 64G is pushed down to impose a vacuum on both of the chambers 78G and 80G, and provide a large "warm" ratio of cold and hot water in the manner previously described. This vacuum breaking feature of FIG. 9 may be applied to any and all of the embodiments of this invention instead of the slow leak constructions, as is obvious.

In the other embodiments which have vacuum chambers and vacuum valves to control the cold water flow and the like, the feature of FIG. 9 may be applied thereto by providing sliding vacuum valves of the type shown at 156G and 158G to the vacuum chambers of the other embodiments with the tubes of the other embodiments being applied to the vacuum chambers above the bottom of the chambers as is shown at 318 and 320 of FIG. 9. Then the atmospheric connections may be placed at the bottom of the vacuum chambers, as shown at 322 and 324, in FIG. 9.

FIG. 9 may have cold water control valves 328 and 330 that are operated by levers 90G, approximately in the same manner as shown in FIG. 7, except that in FIG. 9 the diaphragm and pilot plunger construction have not been illustrated.

The vacuum pump 150G may be controlled by contacts 295G and 298G and lines 300G, with a plug-in 302G, and with the contact 295G operated by the lever 120G substantially in the same manner as contact 295 of FIG. 7 is operated by the lever 294.

The regulated water pipe 38G and cold water pipe 32G may be connected to any of the valve and faucet constructions herein disclosed.

FIGS. 10, 11 and 12 show a construction in which a dial or knob is used to produce the same type of controls that are produced by the push buttons heretofore described. In these FIGS. 10—12, the cold water supply 20H is connected to the cold water pipe 32H. The pipe 32H may be connected to a faucet construction having a manually operated cold water valve and faucet construction 292H with a to 50H similar to 292 of FIG. 7 or to the valve 50 of FIGS. 1 and 2 and which would be connected to a faucet 42 of FIG. 1. The hot water supply or pipe 22H may be supplied with hot water by a water heater or the like with a hot water and regulated mixed hot and cold water pipe 38H which may be connected to a manually operable hot or regulated water valve and faucet 290H with a handle 46H or to a valve similar to 44 of FIGS. 2 and 1 which also would be connected to the faucet 42 of FIG. 1.

A water regulating means 30H receives cold water from the cold water supply 20H and the cold water inlet pipe 34H. A cold water outlet 72H may deliver cold water to be mixed to the junction means 36H. A cold water flow regulating plunger construction 266H similar to 266 of FIG. 6 regulates the amount of cold water that can flow from the inlet 34H to the outlet 72H, depending on the horizontal movement of the plunger construction 266H. When the valve construction 266H is in its right most position, as in FIG. 10, no cold water may pass from the cold water supply 20H to the cold water outlet 72H because the end 268H of construction 266H seals the pipe 34H. Under these conditions, as shown in FIG. 10, only hot water is delivered to the pipe 38H and to the faucet construction 290H connected thereto. At this time, a controlled dial or knob 336 is in its "very hot" position 338 of FIG. 10. As the dial 336 is turned counterclockwise in the elevation of the dial shown in FIGS. 10 and 12, the dial may pass from position 338 through positions 340, 342 and 344. These are positions corresponding to the action produced by the push buttons 60, 62 and 64 of FIGS. 1 and 2 and corresponding push buttons of other embodiments. The position 338 produces water conditions corresponding to those produced by push button 58.

Any means may be used to cause the dial or knob 336 to actuate the plunger construction 266H leftwardly from the position of FIG. 10 through various positions to that of FIG. 12, so that greater passageways are produced past the plunger construction 266H to allow greater proportions of cold water to flow from the cold water supply 20H to the junction means 36H. Such means may take the form of a vacuum pump 150H which produces a vacuum in the chamber 346, pipes 348 and 350, and in the vacuum motor 352. The motor 352 may have a rightwardly biased diaphragm 354 which is rightwardly biased by the spring 356.

Any type of construction may be used to cause the dial 336 to impose a variable vacuum in the vacuum motor 352 to cause the diaphragm 354 to move the valve construction 266H leftwardly in response to counterclockwise movement of the dial 336 to the various positions from 328 to 334.

For example, the dial 336 may operate the shaft 358 which is threaded and is vertically movable into and out of the chamber 360. A diaphragm 362 is connected to the valve 364 which is downwardly pressed by the spring 366, with the spring 366 having its compression load varied by the downward movement of the shaft 358 in response to the turning movement of the dial 336. The valve 364 is connected by the stem 368 with the diaphragm 362. An atmospheric pressure chamber 370 is provided under the diaphragm 362. The chamber 370 has an atmospheric opening 372. A slow and variable leak control passageway 374 is provided with a threaded needle valve 376 which may be turned by a screwdriver or the like to provide variable leakage through the leak passageway 374.

The construction FIG. 12 is such that the washer construction 378 at the bottom of the shaft 358 varies the compression of the spring 366 so that in the dial position 344, the valve 364 and diaphragm 362 are fully depressed. No vacuum which can be produced by the pump 150H in the chamber 346 can move the diaphragm 362 upwardly. The result is that the maximum vacuum is produced in the vacuum motor 352 to pull the plunger construction 266H to its most leftward position. The maximum opening for the flow of cold water from the cold water supply 20H to the junction means 36H is provided.

At the intermediate dial positions 340 and 342 the plunger construction 266H will be at intermediate positions for intermediate flow of cold water. The result is that in dial position 338, the regulated water at 38H is "very hot" with undiluted hot water, and corresponds to the water control of button 58. Dial position 340 causes the same hot mixed water effect as button 60, dial position 342 causes the medium hot water effect of button 62, and dial position 344 causes the warm water effect of button 64, of the buttons of FIGS. 1 and 2, and other buttons previously described in connection with other embodiments having similar numbers with different suffixes.

The plunger construction 266H may have a certain similarity to the plunger constructions which have been described in connection with FIG. 6. The plunger construction 266H may have pressure balancing discs 272H and 270H, etc., as in FIG. 6.

However, the plunger construction 266H is of the character that can prevent any cold water from passing the right end 268H of such plunger construction when such construction is at its right most position. While a cylindrical plunger 268H has been illustrated in FIGS. 10 and 12, such plunger may have any construction in which substantially no cold water can pass at the right most position, and a graduated quantity of cold water can pass as the plunger construction is moved leftwardly. For example, in FIG. 11, a flat valve 380 may be used instead of the cylindrical plunger 266H. Such valve may be carried by the stem 382, which may have the disc 270H and the remainder of the construction to the left of the disc 270H, which is illustrated in FIGS. 10 and 12. The valve 380 may seat against a vertical opening stationary valve seat 384 which is connected to the cold water supply 20H so that there is a substantially tight closing of the opening 386 in valve seat 384 to permit a complete sealing action, or a variable opening, to provide the required regulation heretofore described as the dial 336 is turned.

The dial construction 336 may be connected to the switch construction 388 which has contacts 295H and 298H which are opened and closed by the cam 389, so that such contacts are opened in dial position 338 and closed in the other position of the dial.

The vacuum pump 150H may be connected to the electrical plug 302H with the wires 300H for controlling the operation of the usual motor, not shown, in the vacuum pump 150H as is obvious to those skilled in the art. FIG. 12 shows the position of the cam 389 for closing the contact of the switch 388 in all positions except position 338.

It is therefore to be seen that the construction of the FIGS. 10—12 provides a dial control for obtaining substantially the same water flow conditions which are produced by the corresponding button constructions in other embodiments heretofore described.

FIGS. 13, 14 and 15 show an embodiment in which the mixing action of the cold water with the hot water may be controlled by rotatable means which are in the nature of a cam wheel 390. The cam wheel 390 operates the valve levers 392 and 394. The levers 392 and 394 may open and close the small volume cold water valve 76J and the large volume cold water valve 74J respectively. The small volume valve 76J may have an inlet pipe 396 and the large volume valve 74J may have an inlet 398. The inlets 396 and 398 may be connected to the cold water supply 20J which cold water supply may be substantially the same as previously described in connection with other embodiments.

A mixing means or chamber 70J may be provided for mixing the cold water which is introduced through the valves 76J and 74J. The regulated water leaving through the outlet pipe 38J will be of a character regulated by the opening and closing of valves 74J and 76J and by the operation of these valves by the cam wheel 390, as will be more fully hereafter described.

A hot water supply pipe 22J may be connected to the hot water inlet 400, which may be provided with a hot water restrictor 130J, if necessary. The inlet 400 delivers hot water to the junction means within the mixing means 70J which mixes the cold water which is delivered by the valves 74J and/or 76J with the hot water and delivers the same to the regulated water outlet 38J. The outlet 38J may be connected to a hot water valve 44J. The volume of water may be controlled by the handle or knob 46J. The valve 44J may deliver the water to the faucet construction 42J of the character similar to that shown in FIGS. 1 and 2.

The cold water supply 20J may be provided with a cold water pipe 32J, which may be connected to and controlled by a cold water valve 48J, which may be controlled by the handle or knob 50J. The valve 48J may also discharge into the faucet construction 42J also as indicated in FIGS. 1 and 2.

However, instead of the push button constructions shown in FIGS. 1 and 2, a single push button 402, which is outwardly biased, may be repeatedly pushed in to cause the cam wheel 390 to be rotated at short-turning intervals. The wheel 390 then operates the valve levers 392 and 394 in a manner to select whether the water flowing through the pipe 38J shall be hot water only, as provided by push button 58, or will be as provided by push buttons 60, 62 and 64 of FIGS. 1 and 2, etc.

The push button 402 may alternately contract and expand a drive bellows 404, which is connected to the driven bellows 406 through a fluid pipe 408, simultaneously to expand and contract such bellows 406.

The left end of the bellows 410 may be held stationary by any suitable means, and the right end 412 may reciprocate the reciprocable carriage 414. The carriage 414 reciprocates in the stationary support frame 416, which holds the shaft bearings 418 for the camshaft 420 and for the reciprocating rods 422 and 424 which reciprocate respectively the valve levers 392 and 394. The reciprocable carriage 414 has an upwardly biased lever 426, which engages the central notches 428 in the cam wheel 390.

Whenever the push button 402 is pushed in the lever 426 advances the cam wheel 390 one step to another position for selection of another water control action. The cam wheel 390 shown in the drawings is intended to have two identical programs, each of which requires the rotation of 180° of the cam wheel. The program is then repeated in the other 180° of the wheel, both programs being identical, if desired.

FIG. 15 shows a development of the hills and valleys of the wheel 390 for one program cycle of 180°.

In the positions shown in FIG. 15, the rods 422 and 424 are both in their inward positions, so that the levers 392 and 394 are also in their inward positions and have opened the cold water valves 76J and 74J. Therefore hot water diluted with the maximum amount of cold water flows from the supply 22J through the regulated pipe 38J to the hot water valve 44J and to the faucet 42J, if such valve 44J is open.

An indicating light system may be provided to indicate the condition of the control. For example, a light 430 may be illuminated when the cam wheel 390 is causing a "very hot" water condition similar to push button 58 of FIGS. 1 and 2, other lights 432, 434, and 436 may also be provided which indicate positions of the wheel 390 to produce water flow conditions corresponding to those produced by push buttons 60, 62 and 64.

During the 180° turn of the cam wheel 390 illustrated in FIG. 15, conditions similar to those produced by buttons 58, 60, 62 and 64 are produced, respectively. With the levers 422 and 424 in the valley 438 of FIG. 15 the "warm" water condition of button 64 is produced. With a rotary step of wheel 390 of 45°, caused by one push of the button 402, the cam or hill 440 will advance to alignment between the rods 422 and 424, so that the rod 422 only is pushed leftwardly, and this actuates the lever 392 and opens the small valve 76J to supply a small amount of cold water and produce a "hot water" mix corresponding to the condition of push button 60. With the next step rotation of cam wheel 390 produced by button 402, hill 442 will release rod 422 but will push rod 424 leftwardly, to open valve 74J and close valve 76J, so that a relatively larger amount of cold water is introduced into the mixing means and a medium hot mix is produced, corresponding to the condition produced by push button 62. A further step of the wheel 390 causes the hills 444 and 446 to push out both of the rods 422 and 424 leftwardly and rightwardly and thus close both of the cold water valves 74J and 76J and produce a "very hot" water corresponding to that previously described in connection with push button 58. The next step of the wheel 390 brings the valley 448 into engagement with the rods 422 and 438 again to produce the "warm water" condition previously described in connection with the valley 438.

The cam wheel may have a second set of hills and valleys to repeat the program shown in FIG. 15 for the second half of the 180° rotation of the cam wheel 390, or to produce a different program, if desired. While two programs have been described, it is to be understood that there may be merely one program, or more than two on the cam wheel, as desired.

The levers 392 and 394 are inwardly biased by any built-in spring construction or the like, not shown, so that the rods 422 and 424 follow the cam action of the cam wheel 390, as the wheel turns.

During the operation of the program described in connection with FIG. 15, the lights 430, 432, 434 and 436 have been respectively illuminated to indicate the stage of control produced by the cam wheel 390.

Any type of switch actuator may be provided for proper illumination of the lights 430, 432, 434 and 436. For example, two switch constructions 450 and 452, FIG. 13, may be provided which may have power wires or cables respectively connected to the wires in cable 454, FIG. 14, which enters the control box 456, which carries the push button 402 and the lights 430, 432, 434, and 436. Each of the switch constructions 450 and 452 may have switch actuating plungers 458, which are pushed in by the central cams 460 which actuate the respective switch plungers 458 at the correct time as the wheel 390 is rotated to illuminate the correct light 430, 432, 434 and 436, to indicate the position of the cam wheel 390.

FIGS. 13—15 disclose a construction in which the manually operable cam wheel 390 may be rotated in 45° steps by pushing in the push button 402 for each 45° step, by way of example. Cam wheel 390 operates the rods 422 and 424 and the valve levers 392 and 394, selectively to open and/or close the small valve 76J and/or the large valve 74J. Cold water from the supply 20J may be introduced through the pipes 396 and/or 398 into the mixing chamber 70J and to the mixing or joining means 36J within the chamber 70J, so that regulated water may flow through the pipe 38J to the normally hot water valve 44J which is connected to the faucet 42J. The user may open such valve 44J by the handle 46J so that the correct volume of regulated water of the desired temperature is delivered through the faucet 42J without opening the cold water valve 48J by the handle 50J. On the other hand, the user may close the valve 44J and may open the cold water valve 48J by the handle 50J. Only cold water is then delivered to the faucet 42J substantially corresponding to the water flow conditions previously described in connection with FIGS. 1 and 2 and the embodiments of other FIGS. herein disclosed.

FIGS. 16 and 17 show an embodiment which includes positive latching means and release means.

Push buttons 58K, 60K, 62K, and 64K may be provided which control the water flow from the cold water supply 20K and the hot water supply 22K and control the mixture to the manual valves 44K and 48K and to the faucet means 42K to produce substantially the same water flow results which are produced by the corresponding elements of FIGS. 1 and 2.

That is, the four push buttons 58K, 60K, 62K, and 64K may be pushed in and may be released, and the valves 44K and 48K may be opened and closed by the handles 46K and 50K to obtain the hot water and cold water flows correspondingly produced in FIGS. 1 and 2. For example, if the regulated water valve 44K is opened, and the cold water valve 48K is closed, then the push buttons 58K, 60K, 62K, and 64K may be selectively pushed in to produce respectively "very hot" water when 58K is pushed in, "hot water" mix with a slight dilution of cold water when push button 60K is pushed in, "medium hot water" mix with a greater dilution of cold water when the push button 62K is pushed in, and "warm water" mix with hot water much more diluted with cold water when the push button 64K is pushed in. All of these waters can be delivered to the faucet 42K or similar appliance or shower head, etc., and the volume discharged at such faucet 42K may be regulated by the degree of opening of the valve 44K by the handle 46K. Also, the regulated water valve 44K may be closed and the cold water valve 48K may be opened by the handle 50K and then only cold water will be delivered at the faucet 42K at a regulated volume, depending on the amount of opening of the valve 48K.

The push buttons 58K—64K may be provided with stems 464, 466, 468, and 470 respectively.

These stems may have cross pieces 274 attached thereto.

The cross pieces or discs 474 engage a movable plate 480, which has a flange construction 482, which slides up and down inside a plastic or lubricated strip 484 which is secured to the outer wall 486. The vertical side wall 486, the top wall 488 and the bottom wall 490 are relatively stationary with respect to each other and may be mounted where desired.

Compression springs 491 upwardly engage and bias plate 480. The lower ends of springs 491 are carried by shelves 493 which are secured to side wall 486.

The stems 464—470 have their lower ends guided by the slidable plate 480. The upper ends of stems 464—470 are guided by the push buttons 58K, 60K, 62K and 64K which are slidable in plate 488 and have lower flanges 495 to limit upward movement of the stems 464—470 and buttons 58K—64K.

Whenever any push button 58K—64K is pushed down, it pushes down its respective stem 464—470, together with its respective cross piece 474, so that the slidable plate 480 is also pushed down by the downward movement of the respective push button 58K—64K.

Another horizontal plate 492 is rigidly held at right angles by the stem 470 of push button 64K, and it is vertically movable by the movement of the push button 64K.

All the stems 464—470 are secured to the discs 474, so that the plate 480 is pushed down when any button 458K—464K is pushed down. The stems 466 and 468 pass through openings 494 in plate 492, so that neither push button 60K or 62K can push the plate 492 down. However, these buttons 60K and 62K respectively can push down the stems 496 and 498 and their top discs or heads 499 of the power elements or bellows 500 and 502 respectively. These bellows 500 and 502 respectively supply actuating fluid to the power elements or bellows 506 and 504 respectively, through pipelines shown in dotted lines connecting them. The bellows 504 and 506 are inwardly biased by the springs 508 and their inward bias likewise produces an upward or outward bias on the bellows 500 and 502, by means of the transmission fluid.

The bellows 504 and 506 have respectively latching stems 510 and 512 which carry valve actuating stems 514 and 516 respectively.

The stems 510 and 512 may be latched in extended position by the latching stems 518 and 520 respectively which are operated by a bellows 522 more fully to be described, and which has a latching and unlatching action.

The valve actuating stems 514 and 516 open and close respectively a large cold water valve 74K and a small cold water valve 76K, which respectively permit a relatively large volume and a relatively small volume of cold water to flow from the cold water source 20K into the cold water outlet 72K which is connected to the junction means or mixing chamber 36K, which also receives hot water from the hot water supply 22K and discharges the regulated water to the regulated water pipe 38K and to the regulated water valve 44K, which may be opened and closed by the handle 46K and may regulate the volume of water passing through the valve 44K and into the faucet 42K and the like.

A power element or bellows 524 is connected to the bellows 522. The bellows 522 is compressed by the spring 526 which has one end supported by the stationary wall 528.

The bellows 524 has a stem 530 which is upwardly pushed by the upward bias which is built into the bellows 524. The bellows 524 is compressed whenever the movable plate 480 is pushed down by any of the push buttons 58K—64K by the action of the discs 474 as heretofore described.

The bellows 524 may be provided with an atmospheric check valve 532, FIG. 17, which is biased into closed position by the light compression spring 534. The bellows 524 may be connected by an air pipe construction or the like 536, with the bellows 522.

The bellows 522 and 524 are pushed down when the movable plate 480 is pushed down by any of the push buttons 58K—64K. The stem 530 compresses the bellows 524 sufficiently to compress the bellows 524 and expand the bellows 522 to push down the stem 538 and the latch members 518 and 520 to release either of the latches 510 and 512, if such latches have been previously engaged together. The bleed hole 540, in FIG. 17, in bellows 522 is sufficiently small to permit the initial compressing action of the bellows 524 to expand bellows 522 and to produce an unlatching action at 518 and 520 and to unlatch the bellows 504 and 506, if they have previously been latched. Further holding down of any of the buttons 60K, 62K and 64K will then cause the stems 510 and 512 of bellows 504 and 506 to be latched when the bellows 522 collapses under the bleeding action at the bleed hole 540, to move the latches 518 and 520 up into engagement will latch stems 510 and 512. The push buttons 60K, 62K and 64K are held down for a sufficient time to permit this last described latching of stems 510 and 512.

In the operation of the apparatus of FIGS. 16 and 17, for example, push button 64K may be pushed down. This causes plate 480 and plate 492 to be pushed down. This in turn pushes down the stems 498 and 496 and bellows 500 and 502. The downward movement of push button 64K will first compress the bellows 524 and expand bellows 522 and cause an unlatching action on any bellows 504 and 506 that may previously have been latched. Thereafter, the bleeding action in the bleed hole 540 will permit the bellows 522 to collapse and allow the latches 518 and 520 to latch the latches 510 and 512 and the bellows 504 and 506, which have been compressed by stems 496 and 498 to move the latches 510 and 512 rightwardly. This action will cause the maximum amount of cold water to pass through the valves 74K and 76K and through the water pipe 72K, junction means 36K, to mix with hot water and pass through regulated pipe 38K, regulated valve 44K, and to the faucet 42K. At the same time, hot water from the hot water supply pipe 22K also entered the junction means of mixing chamber 36K and this hot water mixed with the cold water from the valves 74K and 76K to provide the warm water mix with the largest ratio of cold water, to correspond to the warm water mix produced by push button 64 of FIGS. 1 and 2.

If either one of the push buttons 60K or 62K is pushed down, it will respectively cause an unlatching action by the bellows 522 and 524 by the downward movement of slidable plate 480, previously described, and also will respectively compress the bellows 506 or 504 and open respectively the small valve 76K or the large valve 74K and latch the respective ones of the latches 506 or 504 by the action of the bleed port 540. Actuation of the button 60K causes "hot water" mix with the least amount of cold water to be delivered through the pipe 38K and valve 44K and to faucet 42K. Actuation of the button 62K will cause the unlatching action heretofore described and the compression of bellows 504 to open the large valve 74K and to provide "medium" hot water mix with a medium ratio of cold water.

Pushing down of the push button 58K causes the plate 480 to be pushed down and to operate the bellows 522 and 524 for unlatching any of the previously latched bellows 504 and 506 and place the apparatus in readiness to permit the valves 44K and 48K to be operated manually for supplying either all hot water, all cold water, or a mixture of hot water and cold water merely by the operation of the valves 44K and 48K and without the pushing down of any of the push buttons.

The operation of FIGS. 16 and 17 therefore provides water control substantially of the same character as has been described in connection with FIGS. 1 and 2. However, the actual apparatus and operation is somewhat different, as has been previously described.

In the apparatus shown in FIG. 18, a cold water supply 20L, a hot water supply 22L, from water heater 24L, are provided. The cold water supply 20L is connected to the inlet pipe 34L, which leads to the mixing means 30L, which includes the flow regulating means or valve 70L, which has a discharge pipe 72L, to the junction means 36L, and regulated water pipe 38L. The cold water supply 20L may have a cold water pipe 32L, which may be connected to a cold water valve 48L with handle 50L similar to valve 48 of FIG. 1. The regulated water pipe 38L may be connected to a regulated valve 48L with handle 44L similar to the valve 44. These valves may be connected to a faucet construction in a similar manner as is described in connection with faucet 42 of FIGS. 1 and 2. Any other valve and faucet arrangement as herein disclosed may be used, if desired.

The flow regulating means 70L may be any type of variable flow valve which may be operated by the handle 546 to have positions 60L, 62L, 64L, and "off" position 548.

The bellows 550 may have an internal spring 552 and a stem 554 to operate the handle 546. A vacuum pump 150L may have a suction pipe 556 which imparts a vacuum to the inside of the bellows 550 in a manner to provide the handle positions 60L, 62L, 64L and 548.

A vacuum regulating screw 558 may be rotated by the knob 560 to which it is connected by the actuating transmission or rod 562.

The knob 560 may be provided with a rotatable dial 564, and an electrical contact construction 568. A stationary indicator or pointer 566 may also be provided. The electrical contact construction 568 is such that the electrical motor of vacuum pump 150L is disconnected from the lines $L^1$, $L^2$ at 569 when the dial construction 564 is turned to position 570 which indicates the "very hot" water position corresponding to button 58 in FIGS. 1 and 2, where undiluted hot water is delivered by the pipe 38 to the hot water valve 44. Since the vacuum pump 150L has been stopped and there is no vacuum when the dial 564 has the position 570, the spring 552 will move the handle 546 to the off position 548, where no cold water can reach the junction point 36L, and only undiluted hot water is delivered to the valve 44L. Also cold water may be obtained at valve 48L under these conditions.

When the dial 564 is turned so that indication 574 is opposite the pointer 566, then the maximum vacuum is provided in the suction pipe 556, by having the screw 558 close the orifice 572 to provide the maximum vacuum and so that the handle 546 is pulled to position 60L to provide hot water diluted only with a very small amount of cold water and corresponding to the "hot water" mix action of push button 60.

When the knob 560 and dial 564 are turned to the positions 576 and 578, the screw 558 is moved outwardly from the orifice 572 to decrease the vacuum to the next lower conditions, so that the bellows stem 554 is moved rightwardly to the positions 62L and 64L respectively to increase the amount of cold water introduced into the junction means 36L and to provide water conditions corresponding respectively to push buttons 62 and 64.

Cold water only may be obtained from valve 48L at any time by closing or maintaining closed the regulated water valve 44L.

Figure 19:
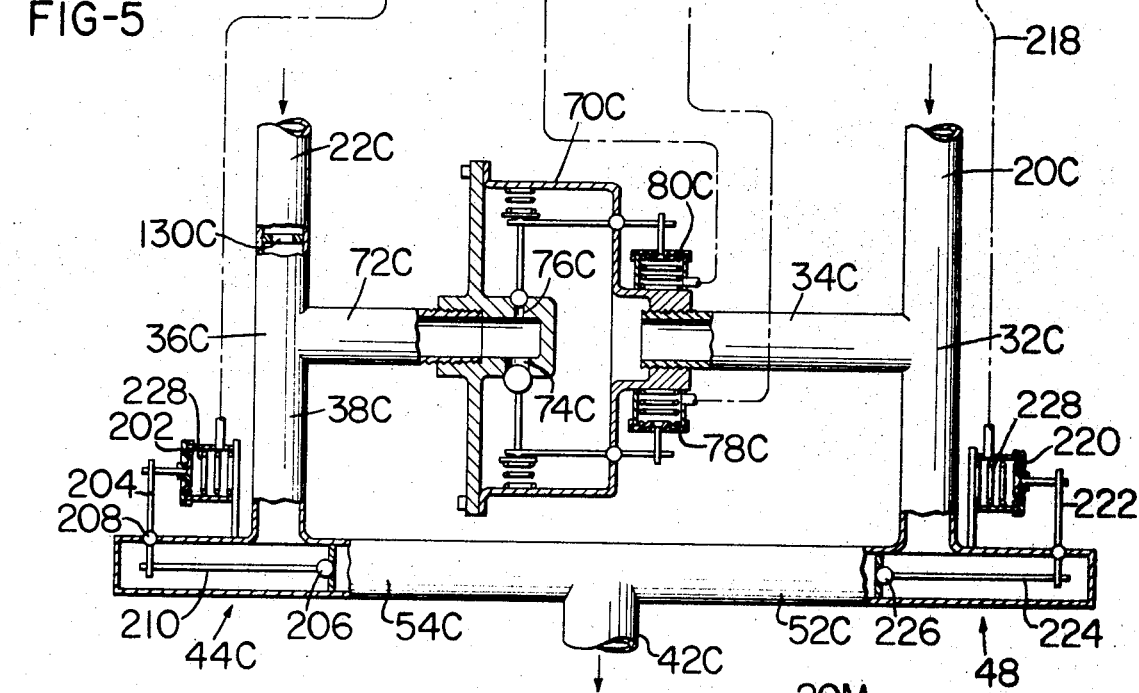
FIG. 19 is a diagrammatic view showing a modified cold water ratio controlling means and a slidable control for the vacuum motors.

FIG. 19 shows a construction in which an upwardly pressed slidable member 584 may be moved laterally by any suitable means, such as lever 580, which is fulcrumed at 582 and is connected to member 584 by connecting rod 583 so that the lever 580 and slidable member 584 may be laterally moved to positions 58M, 60M, 62M and 64M to produce water conditions corresponding to those produced by buttons 58, 60, 62 and 64 of FIGS. 1 and 2. Slidable member 584 has a cavity 586 which can be connected to the vacuum pump 150M by the pipe 588. The cavity 586 may also be connected to the small volume flow bellows 80M and to the large volume bellows 78M or to both of the bellows 78M and 80M as the slidable member 584 is moved rightwardly from position 58M serially to the positions 60M, 62M and 64M, as indicated by the dot and dash line. The slidable member 584 produces the same water flow results when it is in the position 58M—64M that are produced by the push buttons 58, 60, 62 and 64 in FIGS. 1 and 2 and correspondingly numbered push buttons of other embodiments.

When the slidable member 584 is in the position of 58M its two orifices 590 and 592 are not aligned with the openings or pipes 588, 594 and 596. Therefore, in the position 58M for the slidable member 584, the vacuum pump 150M cannot be connected to either of the pipes 594 or 596 or to the bellows 78M and 80M. Under these conditions, the small cold water valve 76M and the large cold water valve 74M are self biased in closed positions and no cold water can enter through the inlet pipe 34M or the cold water pipe 35M into the cold water regulating means 70M or into the pipe 72M or to the junction means 36M. Therefore, only undiluted hot water can enter the regulated water pipe 38M or the regulated water valve 290M for discharge through its faucet.

In the system shown in FIG. 19, cold water supply means 20M is connected to the cold water faucet valve 292M and also to the cold water pipe 32M, which has branches connected to the inlets 34M and 35M of the flow control means 70M. The small volume cold water valve 76M is normally closed and is only opened when a vacuum is imposed on the bellows 80M. Likewise, the large volume cold water valve 74M is normally closed and is open only when a vacuum is imposed on the bellows 78M. These cold water valves 76M and 74M receive the cold water through the inlets 34M and 35M and discharge the water into the flow regulating means or chamber 70M, which then discharges the regulated cold water through the outlet pipe 72M to the junction mixing construction 36M. A hot water supply pipe 22M feeds undiluted hot water into the junction means 36M and from there into the outlet regulated pipe 38M, either undiluted if no cold water enters through the pipe 72M or diluted with regulated cold water if such cold water enters through the pipe 72M.

Therefore, when the slidable member 584 is in its left most position 58M, it cannot impose a vacuum on the bellows 78M and 80M and therefore the cold water valves 74M and 76M cannot open and no cold water can enter from the supply 20M into the regulating chamber 70M or the mixing chamber 36M to dilute the hot water entering from hot water pipe 22M to the regulated water pipe 38M. Therefore, only undiluted hot water is discharged through the faucet valve construction 290 under these conditions.

When the slidable member 584 is moved rightwardly to position 60M, the vacuum pipe 588 is uncovered by the rightward movement of the end 598 of the upper wall 600, so that the vacuum can be produced in the cavity 586 and then through the orifice 592 which has become aligned with the opening for pipe 594. This permits a vacuum to be produced in pipe 594 and bellows 80M, which then opens the small volume cold water valve 76M to feed the cold water into the regulator 70M, pipe 72M, mixer 36M, to dilute slightly the hot water from 22M, and feed the same through regulator pipe 38M to valve 290M. Therefore, the condition produced by the push button 60 of FIG. 2 and other embodiments is produced when the slidable member 584 is in position 60M.

When the slidable member 584 is moved to position 62M, the orifice 592 connects the vacuum cavity 586 with the inlet to pipe 596 and disconnects pipe 594 and thereby imposes a vacuum only on pipe 596 and bellows 78M. This opens the cold water large volume valve 74M to feed a larger amount of cold water to the regulating chamber 70M, pipe 72M, mixer 36M, and provides a medium hot water mix at pipe 38M corresponding to the flow conditions produced by the push button 62 of FIGS. 1 and 2 and other embodiments of that character.

When the movable member 586 is moved to the right most position 64M, the two orifices 590 and 592 become aligned respectively with the openings for pipes 594 and 596 so that a vacuum is imposed on both of these pipes and to their respective bellows 80M and 78M. This causes both of the cold water valves 74M and 76M to be opened to supply the maximum amount of cold water to the regulating chamber 70M, pipe 72M, mixer 36M and to the regulated water pipe 38M to supply warm water corresponding to that produced by push button 64 of FIGS. 1 and 2 and similar embodiments.

Therefore, in FIG. 19, the slidable member 584 regulates the connection of the vacuum pump 150M to the bellows 78M and 80M to open the normally closed cold water valves 74M and 76M to regulate the amount of cold water entering through the pipe 72M into the mixer 36M to be mixed with the hot water from hot water pipe 22M and into the regulated water pipe 38M. Positions for the slidable member 584, shown at 58M, 60M, 62M, and 64M, which are positions to produce water flow conditions corresponding to those produced by the push buttons 58, 60, 62, and 64, of FIGS. 1 and 2, and other similar embodiments. Any method of maintaining the slidable member 585 against the stationary member 602 may be used, such as spring action, fluid pressure or vacuum, and the like, as desired.

FIG. 20 discloses a construction having three push buttons 60N, 62N, and 64N which produce the same cold and hot water mixtures corresponding to the mixtures of push buttons 60, 62, and 64 of FIGS. 1 and 2, and other embodiments. This control may be used in connection with a water system which may include cold water supply pipe 20N, hot water supply pipe 22N, and mixed cold water and hot water discharge pipe 42N. If desired, the cold water supply 20N may be connected to a combined valve and faucet 604. The hot water supply 22N may be connected to a hot water combined valve and faucet 606. The mixed water discharge 42N may be connected to a mixed hot and cold water combined valve and faucet 608. These faucet valve constructions 604, 606, and 608 may have their individual faucets 610 and individual off and on and volume controlling handles 612. However, the valve constructions 604, 606, and 608 may discharge into a common faucet construction, shower construction, or other discharge means, not shown, if desired.

Pushing in of the push buttons 60N, 62N, and 64N respectively releases any previously pushed in push button in the same manner as is shown and described in connection with FIGS. 1 and 2. In FIG. 20, the push button 62N is shown pushed in to produce a "medium hot" mix. The push buttons may be carried by a front plate 100N and may pass through the leftwardly biased movable plate 108N and the spring receiving plate 107N, which have substantially the same construction and function shown and described in FIG. 2 with reference numerals omitting the suffix N. Further description thereof is therefore believed unnecessary.

When the push buttons are pushed in, they control the position of a plunger construction 266N, which is substantially similar to the construction shown in FIG. 6 for the plunger construction 266.

When the push button 62N is pushed in, as shown in FIG. 20, the plunger end 268N is at a medium position, to allow a medium amount of cold water to pass through the cold water pipe 614 and into the mixed water pipe 42N. At the same time, hot water may pass through the hot water pipe 616 to the mixed water pipe 42N. The user may select whether mixed water is to be discharged through the faucet 610 or not by manipulating the handles 612 to open the valve 608, or throttle the valve 608 or close the valve 608 as desired. The user also may select to have cold water discharged by the cold water valve 604 through its faucet 610 by manipulating its handle 612 for opened, closed, or throttled position. Also, the user may elect to use the hot water valve 606, to discharge undiluted hot water through its faucet 610 by manipulation of its handle 612. Again, the user may open, close, or throttle the valves 604 or 606 as desired. As previously described, the nozzles or faucets 610 may be combined into a single discharge faucet, shower head, or the like, if desired, which then would discharge whatever condition of water the user elects, by manipulation of any one or more of the handles 612 and any one or more of the push buttons 60N, 62N, and 64N.

When the push button 62N was pushed in as illustrated, the plunger construction was moved as shown in full lines, to produce a medium mixture of hot and cold water. When the push button 60N is pushed in, the push button 62N is released and the lever 618 is caused to swing about the fulcrum 620 to the upper dotted line position 618', which causes the end of the plunger 266N to move to the upper dotted line 268N'. This will cause a relatively small amount of cold water to flow through the pipe 614 to the mixed water pipe 42N, so that a relatively hot water mix, slightly diluted with cold water, is discharged at the faucet 608.

When the push button 64N is pushed in, any other push button that has been pushed in is released and the end 268N of the plunger 266N is caused to move down to the dotted line position 268N'', by the movement of the bar 618 to the lower dotted line position 618''. The bar 618 reaches the lower position 618'' by swinging about the fulcrum 622. The push button 64N causes a relatively large amount of cold water to flow through the cold water pipe 614 to dilute the hot water so that a warm mix of hot and cold water is delivered to the mixed water pipe 42N and to the faucet 608.

The bar 618 is controlled and moved by the vacuum motors 624 and 626 that have respectively diaphragms 628 and 630 which are upwardly biased by the springs 632 and 634.

The relationship of the vacuum motors 624 and 626, bar 618, plunger 266N, and cold water pipes 614 and 616, is very similar in relationship and operation to the vacuum motors 246, 248, bar or lever 254, and plunger 266 of FIG. 6 and described in this application. In view of the similarity, it is believed unnecessary to describe further the relationship of and operation of these members, and it is believed that the operation of these members in FIG. 20 is obvious to those skilled in the art in view of this description.

Any vacuum construction may be used to impose the proper vacuums on the vacuum motors 624 and 626 in response to the actuation of the buttons 60N, 62N and 64N. For example, a vacuum pump 150N may be provided which has its suction pipe connected and disconnected with the vacuum motors 624 and 626 by the sliding valves 636 and 638. The sliding valve 636 disconnects the vacuum motor 624 from the vacuum pump when the push button 64N is out or unactuated. Also, the valve 636 connects the vacuum motor 624 to the atmosphere under these conditions, so that the diaphragm 628 is in up position, as illustrated in full lines in FIG. 20.

The sliding valve 638 connects the vacuum motor 626 with the vacuum 150N when the push button 60N is out or in unactuated position. When the push button 60N is pushed in, the vacuum between the pump 150N and the motor 626 is broken and atmospheric pressure is supplied to the motor 626 under these conditions, to allow diaphragm 630 to move to its upper position.

Any desired valve construction may be provided at 636 and 638 to accomplish the foregoing results. For example, valve 636 may have a stationary lower plate 640, which has a sunken channel 642. The push button 64N has a stem 644 which moves the slidable plate 646 upwardly over the plate 640, with a downward channel 648 which connects the vacuum suction of pump 150N to the opening 650 which extends downwardly through the plate 640 and is connected to the vacuum motor 624. Consequently, when the plate 646 is in down position, atmospheric pressure may enter the hole 650 and supply atmospheric pressure to the motor 624. When the plate 646 is up, then the channel 648 matches with the channel 642 and connects the vacuum suction of the pump 150N with the vacuum motor 624, to pull the diaphragm 628 down.

Valve 638 may include a stationary plate 652 and a slidable plate 654. The plate 652 has openings 656 and 658 extending downwardly through the plate 652 and connected respectively with the vacuum pump 150N and with the vacuum motor 626. The under side of the plate 654 is smooth and flat over the channel 660 of the plate 652, so that the holes 656 and 658 are connected with the channel 660 and sealed by the bottom of the plate 654 against entrance of atmospheric air. The plate 654 has a downward channel 662 which has an atmospheric opening 664. When the push button 60N is pushed in, the channel 662 matches and overlies the channel 660, so that the opening 664 admits sufficient atmospheric air to break the vacuum between the pump 150N and the motor 626. This allows the diaphragm to move to upper position with lever 618 at position 618'.

In FIG. 20, after the user has pushed in button 62N to the position shown in FIG. 20, the buttons 60N and 62N are released. Vacuum pump 150N is connected to vacuum motor 626 and disconnected from vacuum motor 636. This places lever 618 in full line position, as shown, and causes plunger 266 to be in "medium hot" mix position where a medium amount of cold water flows through cold water pipe 614 to be mixed with hot water in common discharge pipe 42N.

When push button 60N is pushed in, button 62N is released. This causes slidable plate 654 to move over stationary plate 652 and to move vacuum breaking channel 662 to move over channel 660. This breaks the vacuum in motor 626 so both motors 626 and 624 have no vacuum and the bar 618 moves up to position 618' and plunger end 268N moves to position 268N'. This provides the relatively "hot water" mix at the common pipe 42N.

When push button 64N is pushed in, slidable plate 646 slides over stationary plate 640 and produces a vacuum in vacuum motor 624 while a vacuum is also maintained in motor 626. This pulls the lever 618 to lower position 618'' and plunger end 268N to lower position 618''. A relatively large ratio of cold water passes through pipe 614 to produce a "warm water" mix at common outlet 42N.

The user may select the temperature and volume desired by the manipulation of water valves 604, 606 and/or 608, and by the manipulation of push buttons 60N, 62N or 64N.

It is thus to be seen that new and useful water control combinations and methods thereof have been provided by this invention.

We claim:

1. In combination, a cold water supply means, a hot water supply means, a water dispensing control unit having an outlet, variable flow regulating means intercommunicating said cold water supply means and said hot water supply means, said dispensing control unit having means for causing operation of said variable flow regulating means, a manually operable hot water control means associated with said dispensing control unit controlling the flow of water out of said outlet from said hot water supply means, and a manually operable cold water control means associated with said dispensing control unit controlling the flow of water out of said dispensing control unit from said cold water supply means.

2. A combination according to claim 1 with said variable flow regulating means comprising a cold water inlet means connected to said cold water supply means, a cold water flow regulating means connected to said cold water inlet means, and a junction means connected to said hot water supply means and connected to said cold water flow regulating means.

3. A combination according to claim 2 with said hot water supply means including a hot water discharge pipe having a pressure reducing means responsive to the flow of hot water in said discharge pipe reducing the pressure of hot water in said junction means relatively to the cold water pressure in said cold water inlet means to induce flow of cold water to said junction means.

4. A combination according to claim 2 with said variable flow regulating means having valve means to regulate the flow of cold water through said variable flow regulating means.

5. A combination according to claim 4 with said valve means including a large flow valve and a small flow valve, and means selectively to open and close said valves.

6. A combination according to claim 5 with respective power members actuating said respective valves.

7. A combination according to claim 6 with respective power control members controlling the power of said power members.

8. A combination according to claim 1 with said dispensing control unit having a plurality of push button means having means to regulate said variable flow regulating means and thus the intercommunication of cold water and hot water.

9. A combination according to claim 1 with said manually operable hot water control means being longitudinally movable means.

10. A combination according to claim 1 with manual means to adjust said variable flow regulating means.

11. A combination according to claim 10 with said manual means being longitudinally movable.

12. A combination according to claim 11 with said longitudinally movable means being a plurality of push buttons.

13. In combination, cold water supply means, a hot water discharge pipe, cold water variable regulating flow means, cold water inlet flow means from said cold water supply means to said regulating flow means, water junction means connected to said hot water discharge pipe, cold water outlet means from said regulating flow means to said junction means, said variable regulating flow means having valve means to regulate the flow of cold water through said variable regulating flow means, said valve means including a large flow valve and a small flow valve, means selectively to open and close said valves, respective power members actuating said respective valves, and respective power control members controlling the power of said power members, said respective power members being flexible fluid operable members and said power control members being flexible fluid operating members.

14. In combination, cold water supply means, a hot water discharge pipe, cold water variable regulating flow means, cold water inlet flow means from said cold water supply means to said regulating flow means, water junction means connected to said hot water discharge pipe, cold water outlet means from said regulating flow means to said junction means, said variable regulating flow means having valve means to regulate the flow of cold water through said variable regulating flow means, said valve means including a large flow valve and a small flow valve, means selectively to open and close said valves, respective power members actuating said respective valves, and respective power control members controlling the power of said power members, and push buttons controlling said respective power members.

15. A combination according to claim 14 with another push button controlling said first-named push buttons.

16. A combination according to claim 14 with latch means holding said buttons in actuated position.

17. A combination according to claim 16 with another push button releasing said latch means.

18. In combination, a first fluid supply means, a second fluid supply means, a fluid dispensing control unit having an outlet, variable flow regulating means intercommunicating said first fluid supply means and said second fluid supply means, said dispensing control unit having means for causing operation of said variable flow regulating means, a manually operable second fluid control means associated with said dispensing control unit controlling the flow of fluid out of said outlet from said second fluid supply means, and a manually operable first fluid control means associated with said dispensing control unit controlling the flow of fluid out of said dispensing control unit from said first fluid supply means.